US009070249B2

(12) United States Patent
Radek et al.

(10) Patent No.: US 9,070,249 B2
(45) Date of Patent: Jun. 30, 2015

(54) CONFIGURING WAGERING GAME MACHINES FOR GAMING EFFECTS

(71) Applicant: WMS Gaming, Inc., Waukegan, IL (US)

(72) Inventors: Paul J. Radek, Naperville, IL (US); Edward G. Brunell, Chicago, IL (US); Wingate K. Williams, Palatine, IL (US); Brian L. Yarger, Arlington Heights, IL (US)

(73) Assignee: WMS Gaming, Inc., Waukegan, IL (US)

( * ) Notice: Subject to any disclaimer, the term of this patent is extended or adjusted under 35 U.S.C. 154(b) by 95 days.

(21) Appl. No.: 13/746,697

(22) Filed: Jan. 22, 2013

(65) Prior Publication Data

US 2014/0206432 A1 Jul. 24, 2014

(51) Int. Cl.
*G06F 17/00* (2006.01)
*G06F 19/00* (2011.01)
*G07F 17/32* (2006.01)

(52) U.S. Cl.
CPC .................................. *G07F 17/3223* (2013.01)

(58) Field of Classification Search
CPC . G07F 17/32; G07F 17/3225; G07F 17/3227; G07F 17/323; G07F 17/3232; G07F 17/3234
USPC ........................ 463/16–20, 25, 29–31, 40–43
See application file for complete search history.

(56) References Cited

U.S. PATENT DOCUMENTS 6,843,725 B2 1/2005 Nelson
6,884,170 B2 4/2005 Rowe
6,923,724 B2 8/2005 Williams
6,935,958 B2 8/2005 Nelson
7,316,619 B2 1/2008 Nelson
8,235,816 B2 8/2012 Nelson
8,613,667 B2 * 12/2013 Brunell et al. .................. 463/40
8,808,088 B1 * 8/2014 Brunell et al. .................. 463/31
8,814,673 B1 * 8/2014 Brunell et al. .................. 463/30
8,912,727 B1 * 12/2014 Brunell et al. ................ 315/192

(Continued)

FOREIGN PATENT DOCUMENTS

WO WO-2007103426 9/2007
WO WO-2011056859 5/2011

OTHER PUBLICATIONS

"PCT Application No. PCT/US10/55284 International Preliminary Report on Patentability", Mar. 28, 2012 , 7 pages.

(Continued)

*Primary Examiner* — Milap Shah
(74) *Attorney, Agent, or Firm* — DeLizio Law, PLLC

(57) ABSTRACT

A wagering game system and its operations are described herein. In some embodiments, the operations can include detecting a request to configure a wagering game machine for presentation of a wagering game effect. The operations can further include, in response to detecting the request, evaluating, a position of the wagering game machine against criteria for presentation of the wagering game effect. The operations can further include, based on the evaluating the position of the wagering game machine against the criteria for presentation of the wagering game effect, modifying an availability of at least one of a plurality of options to configure the wagering game machine for the presentation of the wagering game effect.

22 Claims, 13 Drawing Sheets

(56) References Cited

U.S. PATENT DOCUMENTS

| | | | | |
|---|---|---|---|---|
| 2002/0152120 | A1 | 10/2002 | Howington | |
| 2002/0160826 | A1* | 10/2002 | Gomez et al. | 463/16 |
| 2003/0130033 | A1* | 7/2003 | Loose | 463/30 |
| 2003/0130039 | A1 | 7/2003 | Nelson | |
| 2003/0148809 | A1 | 8/2003 | Nelson | |
| 2005/0043072 | A1 | 2/2005 | Nelson | |
| 2005/0248299 | A1* | 11/2005 | Chemel et al. | 315/312 |
| 2005/0277469 | A1* | 12/2005 | Pryzby et al. | 463/35 |
| 2006/0079319 | A1* | 4/2006 | Aoki et al. | 463/25 |
| 2006/0217202 | A1* | 9/2006 | Burke et al. | 463/42 |
| 2006/0287098 | A1* | 12/2006 | Morrow et al. | 463/42 |
| 2007/0099697 | A1 | 5/2007 | Nelson | |
| 2007/0155490 | A1 | 7/2007 | Phillips et al. | |
| 2007/0218970 | A1* | 9/2007 | Patel et al. | 463/16 |
| 2007/0218974 | A1* | 9/2007 | Patel et al. | 463/20 |
| 2008/0051198 | A1 | 2/2008 | Nelson | |
| 2008/0113715 | A1* | 5/2008 | Beadell et al. | 463/17 |
| 2008/0268959 | A1 | 10/2008 | Bryson et al. | |
| 2009/0082095 | A1 | 3/2009 | Walker et al. | |
| 2009/0124345 | A1* | 5/2009 | Gilmore et al. | 463/20 |
| 2009/0253497 | A1 | 10/2009 | Bennett et al. | |
| 2009/0265105 | A1 | 10/2009 | Davis et al. | |
| 2009/0305773 | A1 | 12/2009 | Gagner et al. | |
| 2010/0069115 | A1 | 3/2010 | Liu | |
| 2011/0195789 | A1* | 8/2011 | Wells | 463/42 |
| 2012/0129601 | A1* | 5/2012 | Gronkowski et al. | 463/31 |
| 2012/0165101 | A1* | 6/2012 | Krishnamoorthy et al. | 463/42 |
| 2012/0178523 | A1* | 7/2012 | Greenberg et al. | 463/25 |
| 2012/0178528 | A1* | 7/2012 | Brunell et al. | 463/31 |
| 2012/0225726 | A1 | 9/2012 | Anderson et al. | |
| 2013/0035168 | A1* | 2/2013 | Layne, IV | 463/42 |
| 2013/0184078 | A1* | 7/2013 | Brunell et al. | 463/40 |
| 2013/0225268 | A1* | 8/2013 | Caputo et al. | 463/25 |
| 2014/0073426 | A1* | 3/2014 | Patel et al. | 463/31 |
| 2014/0073430 | A1* | 3/2014 | Brunell et al. | 463/35 |
| 2014/0287823 | A1 | 9/2014 | Anderson et al. | |

OTHER PUBLICATIONS

"PCT Application No. PCT/US10/55284 International Search Report", Feb. 28, 2011 , 10 pages.

"U.S. Appl. No. 13/508,058 Final Office Action", Feb. 25, 2014, 16 Pages.

"U.S. Appl. No. 13/508,058 Office Action", Oct. 21, 2013 , 12 Pages.

Co-pending U.S. Appl. No. 14/298,712, filed Jun. 6, 2014, 18 pages.

* cited by examiner

CONFIGURING WAGERING GAME MACHINES FOR GAMING EFFECTS

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

TECHNICAL FIELD

Embodiments of the inventive subject matter relate generally to wagering game systems and networks that, more particularly, configure wagering game machines.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

However, wagering game providers and wagering game machine manufacturers run into challenges with controlling and presenting data on wagering game machines, servers, and other devices. For example, some wagering game machines are configured to present a gaming effect (e.g., a light show, an attract sequence, a multi-media presentation, a wagering game bonus, etc.) that is capable of being presented in a synchronized pattern across multiple wagering game machines set up as a group, or "bank," of machines. Casino operators, however, must properly position the configured wagering game machines relative to each other, and/or properly connect wiring of the wagering game machines, so that the presentation of a synchronized gaming effect displays correctly across each of the wagering game machines in the bank. If even one of the wagering game machines is improperly positioned or connected, the synchronized presentation of the gaming effect will appear to flow incorrectly across the bank. If the synchronized presentation appears to flow incorrectly, casino patrons may become confused or may believe that one or more of the wagering game machines in the bank are functioning incorrectly. The casino patrons, therefore, may choose not to play the wagering game machines of the bank, thus leading to loss of revenues. In some cases, if the gaming effect is related to a wagering game feature on which a casino patron is already playing, then the casino patron may become confused about an outcome of a wagering game, which can further discourage a patron, potentially lead to disputes, erode customer satisfaction, etc. Therefore, there is a continuing need to provide ways to ensure proper presentation of gaming effects that can be presented across multiple wagering game machines.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into four sections. The first section provides an introduction to embodiments. The second section describes example operations performed by some embodiments while the third section describes example operating environments. The fourth section presents some general comments.

Introduction

This section provides an introduction to some embodiments.

As mentioned previously, there is a continuing need to provide ways to ensure proper presentation of gaming effects that can be presented across multiple wagering game machines. Described herein are some examples of a wagering game system ("system") to configure gaming effects. The system adjusts configuration options according to a position of a wagering game machine according to presentation criteria for the gaming effect. In some examples, the system disables specific configuration options, based on certain conditions, such as (1) a position of the wagering game machine in an order or a sequential presentation pattern, (2) a position of the wagering game machine relative to other wagering game machines in a bank, (3) how other wagering game machines in a bank have been previously configured for a specific type of gaming effect, (4) a number of wagering game machines in a bank, and so forth. In some examples, the system provides options to configure gaming effects at each wagering game machine within a bank (e.g., while an operator is located at each of the wagering game machine). Some examples provide for remote configuration with a local indicator at the wagering game machine, such as a light and/or sound presented at the wagering game machine, to provide a visual and/or audible clue as to which wagering game machine in a bank is being configured. These, and many other example features, are described further below.

Figure 1:
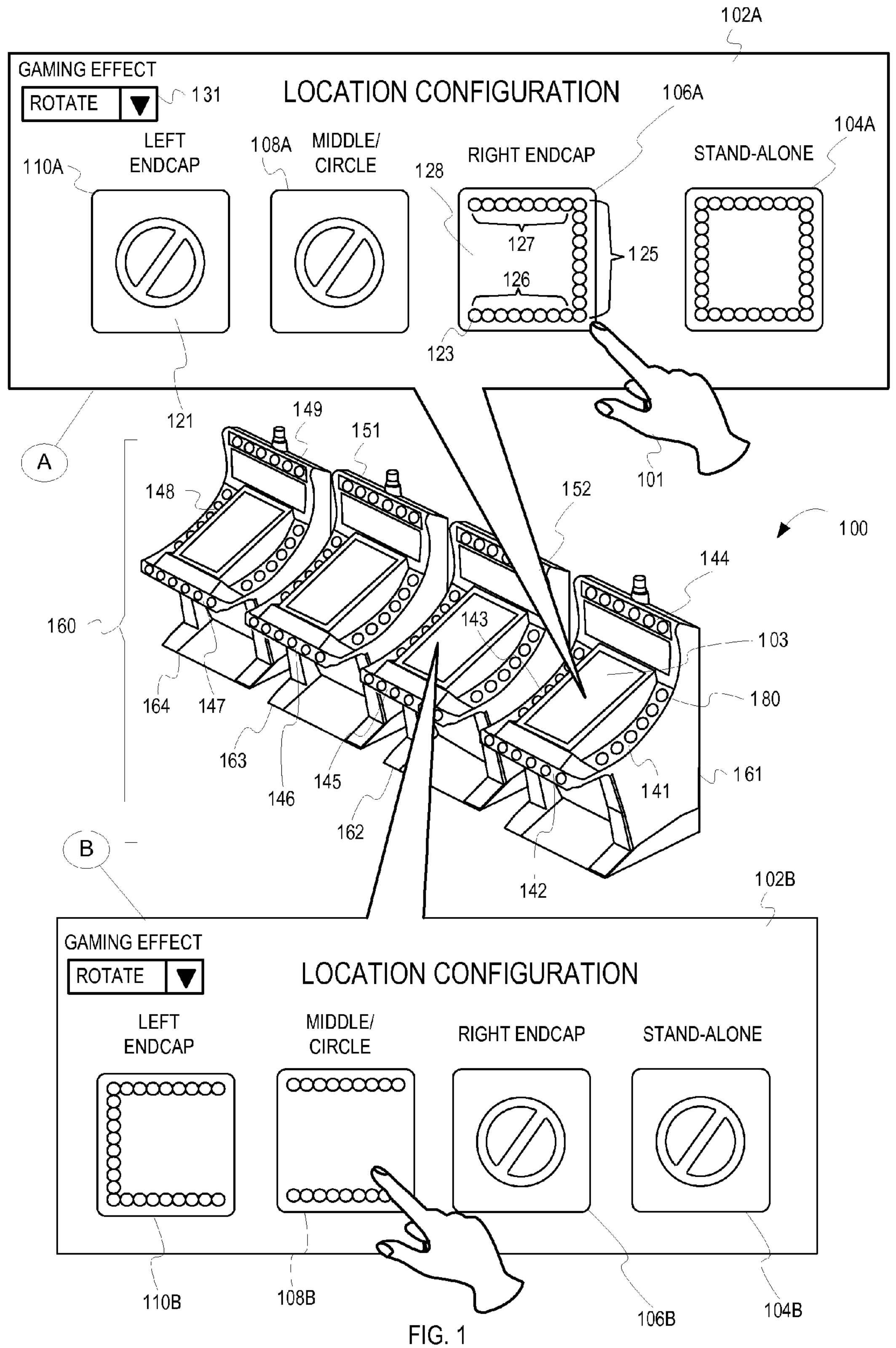
FIG. 1 is an illustration of dynamically adjusting configuration options for a gaming effect for presentation via one or more wagering game machines in a bank unit, according to some embodiments.

FIG. 1 is a conceptual diagram that illustrates an example of dynamically adjusting configuration options for a gaming effect for presentation via one or more wagering game machines in a bank unit, according to some embodiments. In FIG. 1, a wagering game system ("system") 100 includes wagering game machines 161, 162, 163, and 164 ("wagering game machines 161-164") networked together as a bank unit ("bank") 160. The wagering game machines 161-164 are positioned next to each other, each facing the same direction (i.e., a front of each of the wagering game machines 161-164 is facing a same general direction viewable from a given perspective). However, the wagering game machines 161-164 can be oriented in other ways or in various shapes (e.g., a circle, a semi-circle, an arc, a rectangle, a partial rectangle, etc.). The wagering game machines 161-164 have output devices configured to present specific effects related to wagering games ("gaming effects"). For example, the wagering game machine 161 includes emotive light panels 141, 142, 143, and 144 with emotive lights 180 configured to present a gaming effect.

At a first stage "A," the system 100 initiates a configuration application in response to user input (e.g., in response to a user 101 that interacts with the wagering game machine 161). The configuration application includes a configuration interface 102A with options (e.g., graphics 104A, 106A, 108A, and 110A) to configure a role, or part, that the wagering game machine 161 performs in a gaming effect. The gaming effect may be one of many different types of effects selectable from a gaming effect control (i.e., the dropdown control 131). For example, the gaming effect specified in the dropdown control 131 (i.e., the "rotate" effect) is programmed to cause emotive lights 180 to activate on one or more of the emotive lighting devices for any of the wagering game machines 161-164. The rotate effect includes a synchronized light show using any of the emotive light panels 141, 142, 143, and 144 of the wagering game machine 161, or any equivalent emotive light panels on the wagering game machines 162, 163, or 164. The rotate effect causes the light show to appear to travel in a clock-wise rotating pattern around one or more of the wagering game machines 161, 162, 163 or 164.

The rotate effect can be configured to appear in a stand-alone mode or in a bank mode. A graphic 104A specifies an option to configure the wagering game machine 161 in the stand-alone mode. The stand-alone mode causes the rotate effect to appear on the wagering game machine 161 independent of other wagering game machines 162, 163, or 164 in the bank 160. For example, if the rotate effect is presented on only the wagering game machine 161, the rotate effect would appear to move in a rotating pattern from the emotive light panel 141, to the emotive light panel 142, to the emotive light panel 143, to the emotive light panel 144, back to the emotive light panel 141, and so forth.

Graphic 106A, however, specifies an option to configure the wagering game machine 161 in the bank mode. The bank mode causes the rotate effect to appear on the wagering game machine 161 and one or more of the other wagering game machines 162, 163, or 164, as part of a group presentation that in synchronized across some, or all, of the bank 160. The parts of the group presentation can be distributed over various networked devices (e.g., the wagering game machines 161-164), and may be referred to as "nodes" of the network that are configured for a particular function or feature within the gaming effect. The rotate effect in bank mode requires at least one of the wagering game machines 161-164 to be a beginning node (e.g., a "right endcap" node at a far-right end of a group of nodes in one configured instance of a bank mode) and at least one of the wagering game machines 161-164 to be a terminating node (e.g., a "left endcap" node at a far-left end of a group of nodes in the one configured instance of the bank mode). The beginning node and terminating node form two ends of a sequence of nodes that complete the proper appearance of the rotating lighting effect, similar to how two halves of a rectangle, when connected properly, form an enclosed rectangle. The graphic 106A indicates that the wagering game machine 161 can be configured as the first node (e.g., the right endcap node) in the synchronized group presentation of nodes for the gaming effect. The graphic 106A can be activated via a touch by the user 101 via a touchscreen video display 103 on which the configuration interface 102A is presented. If the graphic 106A is activated, then the system 100 configures the wagering game machine 161 to be the beginning node, at the far-right end of the bank 160.

In some embodiments, the system 100 detects that none of the other wagering game machines 162, 163, or 164 have been configured yet regarding the synchronized presentation. Therefore, the system 100 causes options associated with graphics 108A and 110A to be deactivated, or unavailable for user input. In other words, the system 100 detects that no other nodes have been set yet in the bank mode for the rotate effect. Therefore, the system 100 provides only the two configurable options associated with graphic 104A and 106A (e.g., graphics 104A and 106A have symbols 123 that represent a specific configuration of how emotive lights would be presented at a node if configured for that particular option). Graphics 108A and 110A take on the appearance of being prohibited or disabled, (e.g., 108A and 110A have a symbol 121 that indicates restriction or deactivation, however other forms may include a "grayed out" feature, a "locked" feature, or so forth).

In some embodiments, for graphic 106A, a first portion of the symbols 123 are presented as a right-hand side, vertical column ("column 125"). The column 125 is connected to a second portion of the symbols 123 presented as a lower, horizontal row ("row 126") perpendicular to the column 125. The column 125 is also connected to a third portion of the symbols 123 presented as an upper, horizontal row ("row" 127) also perpendicular to the column 125. A left side 128 of the graphic 106A, however, appears empty, or free from symbols 123. The column 125 corresponds to the emotive light panel 141, the row 126 corresponds to the emotive light panel 142 and the row 127 corresponds to the emotive light panel 144. Thus, the shape of the column 125 and rows 126 and 127 gives the appearance of a node of the rotate effect that would produce light effects on a top, bottom and right-hand side of wagering game machine 161, but not on the left-hand side of the wagering game machine 161. In other words, the graphic 106A indicates that, if selected, the wagering game machine 161 would be configured so that a presentation of the gaming effect for wagering game machine 161 would cause the emotive light panels 141, 142, and 144 to present lighting effects, but not emotive light panel 143.

At stage "B," after configuring the wagering game machine 161 as a right endcap node, the user 101 activates a configuration application on the wagering game machine 162. The system 100 presents a configuration console 102B with options that are only available for the wagering game machine 162 based on what was selected at stage "A" for wagering game machine 161. For instance, the system 100 presents graphics 104B, 106B, 108B and 110B. Because, at stage "A," wagering game machine 161 was configured as a right endcap node, then the synchronized presentation of the gaming effect cannot have another right endcap node. Any other wagering game machine configured for the synchronized presentation in bank mode must be either a middle node or left endcap node, to complete the rotating appearance of emotive lights in the bank 160 according to the criteria of the rotate effect. The wagering game machine 162, therefore, may be configured as either a middle node (i.e., by selection of graphic 108B) or a left endcap node (i.e., by selection of graphic 110B). Because the rotate effect requires configuration of both a right endcap node and a left endcap node, if the wagering game machine 162 is selected as a middle node, then the rotate effect would be extended and remain uncompleted until a left endcap node is selected for either the wagering game machine 163, or 164. In a similar fashion, wagering game machine 163 may be configured as a middle node or a left endcap node. If the wagering game machine 162 were to be selected as a middle node then a configuration interface to configure wagering game machine 163 would appear to have active options to configure the wagering game machine 163 as either a middle node or left endcap node. If wagering game machine 162, however, were selected as a left endcap node, then the options to configure wagering game machine 163 would again include options to either configure wagering game machine 163 in a stand-alone mode or an option to begin a new right endcap node for a second instance of the rotate effect.

Figure 2:
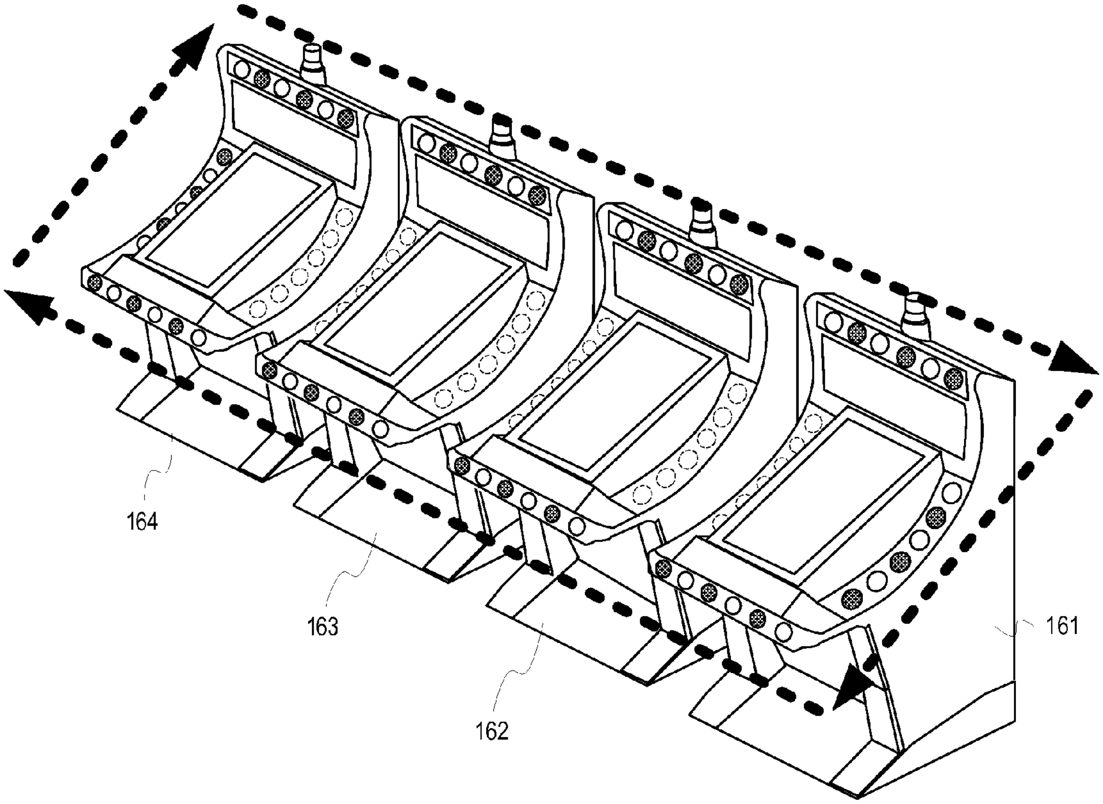
FIG. 2 is an illustration of presenting a gaming effect via a bank of wagering game machines, according to some embodiments.

The entire bank 160 can be configured for a single instance of the rotate effect. For example, wagering game machine 161 can be selected as right endcap node, wagering game machines 162 and 163 can be selected as middle nodes, and wagering game machine 164 can be configured as a left endcap node. If activated, the rotate effect would appear to travel in a clock-wise rotating pattern across the bank 160. For example, the rotate effect would present a sequence of lights on the emotive light panel 144 that appears to travel to the emotive light panel 141, then to the emotive light pattern 142. However, instead of moving to the emotive light panel 143 (as it would in stand-alone mode), the rotate effect continues to the emotive light panel 145 of the wagering game machine 162. Then the rotate effect continues to the emotive light panel 146 of the wagering game machine 163, then to the emotive light panel 147 of the wagering game machine 164, and so forth to the emotive light panel 148, then to the emotive light panel 149, then to emotive light panel 151, then to the emotive light panel 152, then back to the emotive light panel 144. The rotate effect, therefore, follows a synchronized presentation in a clock-wise pattern across the bank 160 (as shown in FIG. 2).

Referring still to FIG. 1, in some embodiments, the system 100 can detect a position of any particular one of the wagering game machines 161-164 when being configured. For example, back at stage "A," the system 100 could have detected the position of the wagering game machine 161 relative to the other wagering game machines 162, 163, and 164. The system 100, for instance, could determine that the wagering game machine 161 is at a far-right end of the bank 160. Therefore, the system 100 makes an option available for the "right" endcap instead of a "left" endcap. In other words, the system 100 presents the graphic 106A, to configure the wagering game machine 161 as a right endcap node, and, concurrently, the system 100 presents the graphic 110A so that the wagering game machine 161 cannot be configured as a left endcap node. Likewise, if the wagering game machine 164 was the first to be selected for configuration, the system 100 could present an option to configure the wagering game machine 164 as either a stand-alone node or a left endcap node.

In some embodiments, however, the system 100 is unaware of the position of the wagering game machine 161 relative to the other wagering game machines 162, 163, and 164 within the bank 160. In such an example, the system 100 could present options to configure wagering game machine 161 as either a right endcap node, a left endcap node, or a middle node. The user 101 could select the appropriate option of either a right endcap node, a left endcap node, or middle node based on visual inspection of the position of the wagering game machine 161 within the bank 160. If the wagering game machine 161 were to be configured as a left endcap node, the system 100 could cause emotive lights 180 to light up emotive light panel 144, 143, and 142. The user 101 could then see that the appearance of emotive lights 180 as a left endcap node causes the rotate effect to point in the wrong direction given the position of the other wagering game machines 162-164 relative to wagering game machine 161. Therefore, the user 101 could reconfigure wagering game machine 161 as a right endcap node.

Further, some embodiments of the inventive subject matter describe examples of configuring wagering game machines for gaming effects in a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. In some embodiments, the wagering game machines 161-164 can communicate with each other, such as via a communications network, a peer-to-peer network, a wireless network (e.g., WiFi), etc.

Multiple users can be connected to the networks via computing devices. The multiple users can have accounts that subscribe to specific services, such as account-based wagering systems (e.g., account-based wagering game websites, account-based casino networks, etc.). Further, for purposes of the present detailed description, a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Furthermore, for purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Although FIGS. 1 and 2 describe some embodiments, the following sections describe many other features and embodiments.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
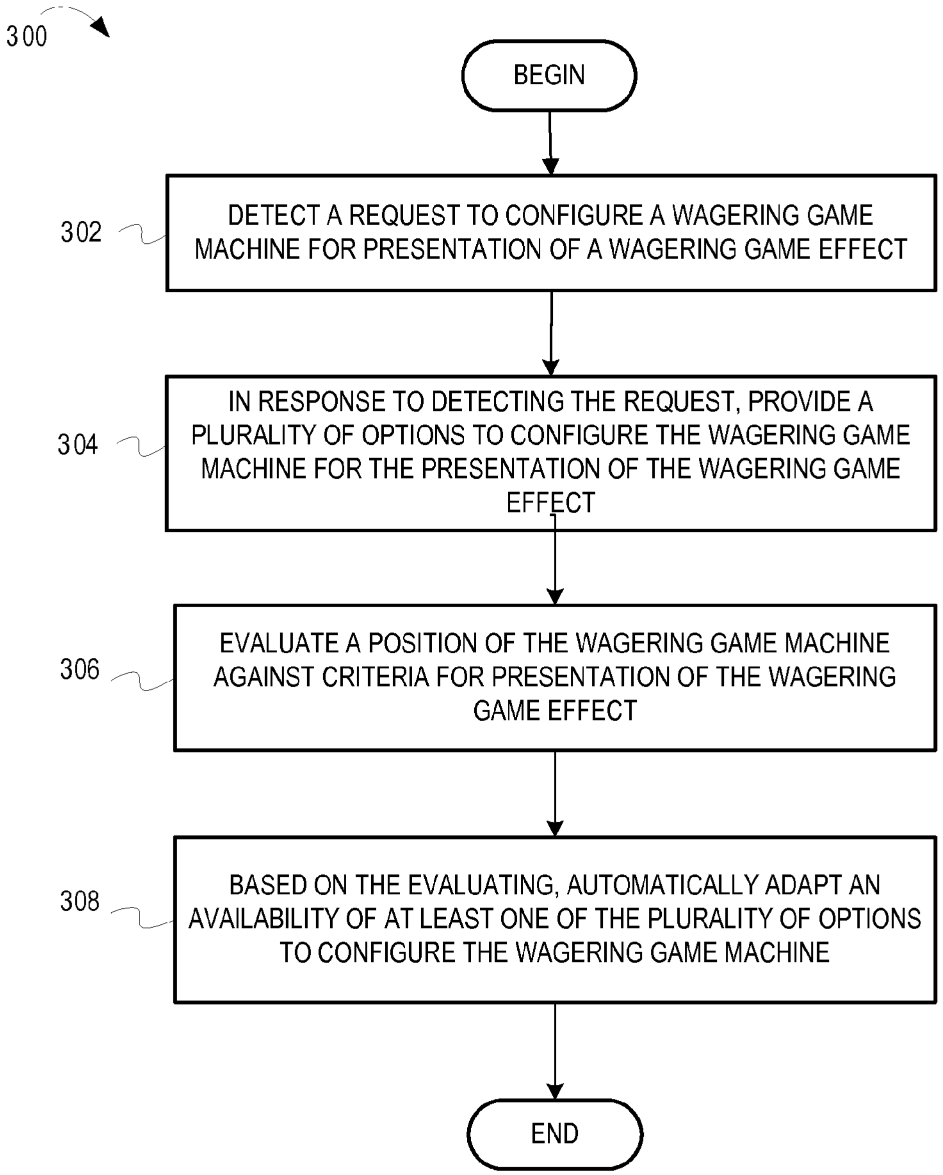
FIG. 3 is a flow diagram 300 illustrating dynamically adjusting configuration options for a gaming effect for presentation via one or more wagering game machines, according to some embodiments.

FIG. 3 is a flow diagram ("flow") 300 illustrating dynamically adjusting configuration options for a gaming effect for presentation via one or more wagering game machines, according to some embodiments. FIGS. 4, 5, 6, and 7 are conceptual diagrams that help illustrate the flow of FIG. 3, according to some embodiments. This description will present FIG. 3 in concert with FIGS. 4, 5, 6 and 7. In FIG. 3, the flow 300 begins at processing block 302, where a wagering game system ("system") detects a request to configure a wagering game machine for presentation of a wagering game effect. The wagering game machine can be networked together with other wagering game machines. For example, the wagering game machines can be connected in a series, sequence, circle, etc. (e.g. plugged into each other). The wagering game machines can be physically arranged, in close proximity to each other, on a casino floor in a group or unit called a "bank." In some embodiments, the wagering game effect is capable of being presented according to a synchronized pattern via the wagering game machines in the bank.

In some embodiments, the system detects a request to configure the wagering game machine by detecting a user input associated with the wagering game machine. In some embodiments, the system detects whether all of the wagering game machines in a bank are available for configuration (e.g., determine that no-one is playing a machine, that all session balances are at zero, that all of the wagering game machines are in an idle state or in an attract mode, etc.). The system can then permit a wagering game machine to be configured for the wagering game effect in response to detecting the request to configure the wagering game machine.

Figure 4:
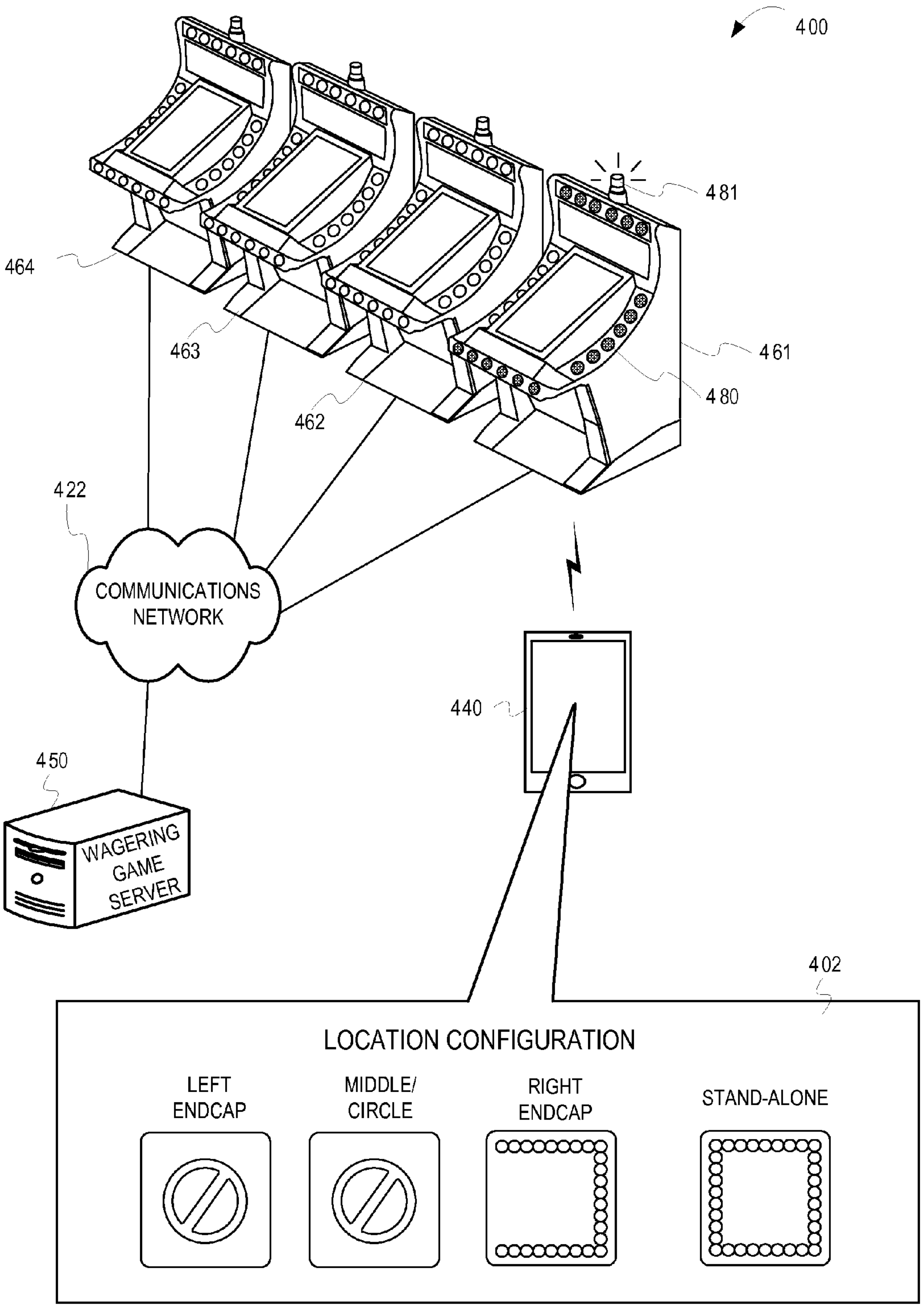
FIG. 4 is an illustration of remotely configuring one or more wagering game machines for a gaming effect, according to some embodiments.

In some examples, the system can detect when an operator (e.g., user) launches an application via a user interface of the wagering game machine as similarly described in FIG. 1. In another embodiment, however, the system can detect when an operator launches a configuration application on a remote device, such as a server, a portable handheld mobile device (e.g., a tablet computer), a scanning device, etc. FIG. 4 illustrates an example of configuring wagering game machines remotely. In FIG. 4, a wagering game system ("system") 400 includes a bank of wagering game machines 461, 462, 463, and 464 ("wagering game machines 161-164") are connected to a communications network 422. Also connected to the communications network 422 is a wagering game server 450. A remote, mobile configuration device ("mobile device") 440 is also connected to the communications network 422 (e.g., wirelessly). The mobile device 440 can communicate with the wagering game server 450 via the communications network 422 to obtain identifying information about the wagering game machines 161-164. The mobile device 440 can present a configuration interface 402, similar to the configuration interfaces 102A or 102B described in FIG. 1. However, the configuration interface 402 can be used to configure any of the wagering game machines 161-164 (i.e., as opposed to having to configure each of the wagering game machines 161-164 via their separate displays, as described in FIG. 1). FIG. 4 will be referred to again further below.

Returning again to the description of FIG. 3, the system can configure any type of wagering game effect. In some embodiments, the wagering game effect is a lighting effect, such as an attract show. The attract show may be a rotating effect, similar to that described in FIG. 1. In another example, the attract show may be programmed to synchronize a color wash across a bank of wagering game machines. For example, the wagering game effect may appear to travel in a fluid, continuous, and synchronous pattern across bank of wagering game machines, such as in a wave pattern. A particular color from the effect can appear to move across the bank, from one direction to another (e.g., left to right, up-to down, diagonally, etc.) without obvious gaps or without the color appearing out of order in its presentation. In some embodiments, the system sets up (i.e., configures) the effect based on the relative, physical order, or location, of the wagering game machines on the casino floor. For example, a relationship of various parts of the gaming effect corresponds to a relative order, or position, of the wagering game machines to each other. In some embodiments, the wagering game machines are contiguous in order. However, a physical distance between the wagering game machines does not have to be uniform.

In some embodiments, the wagering game effect is a visual effect for a wagering game feature. The video effect may have been created so that its presentation spans across displays of a bank of wagering game machines. For example, a wagering game may present a feature that presents an effect where ships battle against each other. The ships are presented on different displays of wagering game machines that are positioned next to each other in a bank. The feature is programmed so that the ships fire cannon balls at each other. The cannon balls appear to travel across a display of one wagering game machine to a display of the next machine in a continuous arc similar to a trajectory that a cannon ball takes when it is fired from a cannon.

In some embodiments, the wagering game effect is an audio effect. For example, the effect may be a sound of thunder that travels from one direction to another across speakers of wagering game machines in a bank.

The flow 300 continues at processing block 304, where in response to detecting the request to configure the wagering game machine for presentation of the wagering game effect, the system provides a plurality of options to configure the wagering game machine for the presentation of the wagering game effect. For example, in response to detecting the request to configure the wagering game machine, the system presents a configuration console (e.g., a configuration application or wizard) on the individual machine being configured. The configuration console can be presented on any wagering game machine within a bank, as in FIG. 1. In some examples, an operator can launch the application associated with the configuration console as the operator walks from each wagering game machine to the next and interacts with a display, or other controls, of the wagering game machine. The system can detect that the operator has activated a control of the currently configured wagering game machine and launch an application, which presents the configuration console. Each of the applications includes options for configuration that are distinct, or unique, to that particular wagering game machine. Thus, the system can cause each display screen of the bank of wagering game machines to separately display the configuration console with options that are unique to the wagering game machine.

In some examples, the system can include a scanner device. An operator can scan a wagering game machine to configure which then causes a display (e.g., on the wagering game machine, on the scanner device, on a remote configuration device, etc.) to present the configuration console. In some embodiments, the system can track the order in which wagering game machines are scanned. The system can then order the sequence for the presentation of the wagering game effect according to the order in which the wagering game machines were scanned. For example, an operator can scan each wagering game machine in a bank in the order in which the gaming effect should be presented. As the operator scans each of the individual machines, the system assigns a numerical identifier to the wagering game machine to represent the nodal order of the wagering game machine in the sequence for the gaming effect. The system can then use the numerical identifier to adapt configuration options, present graphical representations of the sequence, etc.

In some embodiments, the system can present a configuration console via an application on a remote configuration device, such as a mobile device, a server, etc. The remote configuration device can be portable (e.g., a tablet computer or other mobile device), such as the configuration console 402 presented via the mobile device 440 shown in FIG. 4, which presents configuration options unique to wagering game machine 461 (similar to those shown at stage "A" of FIG. 1). The remote configuration device can communicate with other devices on the network, such as a server (e.g., wagering game server 450).

In some embodiments, the remote configuration device presents identifiers that indicate the wagering game machine relative to others of the plurality of wagering game machines for the wagering game effect. For example, when an operator selects one of the wagering game machines to be configured, the system can cause a visual or audio indicator to appear on the wagering game machine (e.g., turn on the overhead light, or "candle," of the currently configured wagering game machine, emit a tone from speakers of the currently configured wagering game machine, etc.). Thus the system can affirm visually, or audibly, to the operator which of the actual wagering game machines was selected. In FIG. 4, when the mobile device 440 selects the wagering game machine 461 for configuration (e.g., via a scan of a coded identifier on the wagering game machine 461, via a near-field detection, etc.), the system 400 can present an indicator on the wagering game machine 461 to indicate that the wagering game machine 461 is currently being configured for the gaming effect. For example, the system 400 can cause an overhead light (e.g., candle 481) to light up, cause emotive lights 480 to light up, cause a speaker on the wagering game machine 461 to make a tone, etc.

In another example, during configuration of the wagering game machine, the system can present identifiers as graphical representation of the wagering game machine relative to other wagering game machines in the bank. For example, the system can present a grid of graphical objects, where each of the graphical objects represents a particular one of the wagering game machines in the bank. In some examples, the graphical objects appear spaced relatively similar to how they physically appear in relation to each other on the casino floor. Each of the graphical objects represents a particular wagering game machine. When one of the graphical objects is selected (e.g., via a configuration console), the system can present only the configuration options available for that particular wagering game machine.

Figure 5:
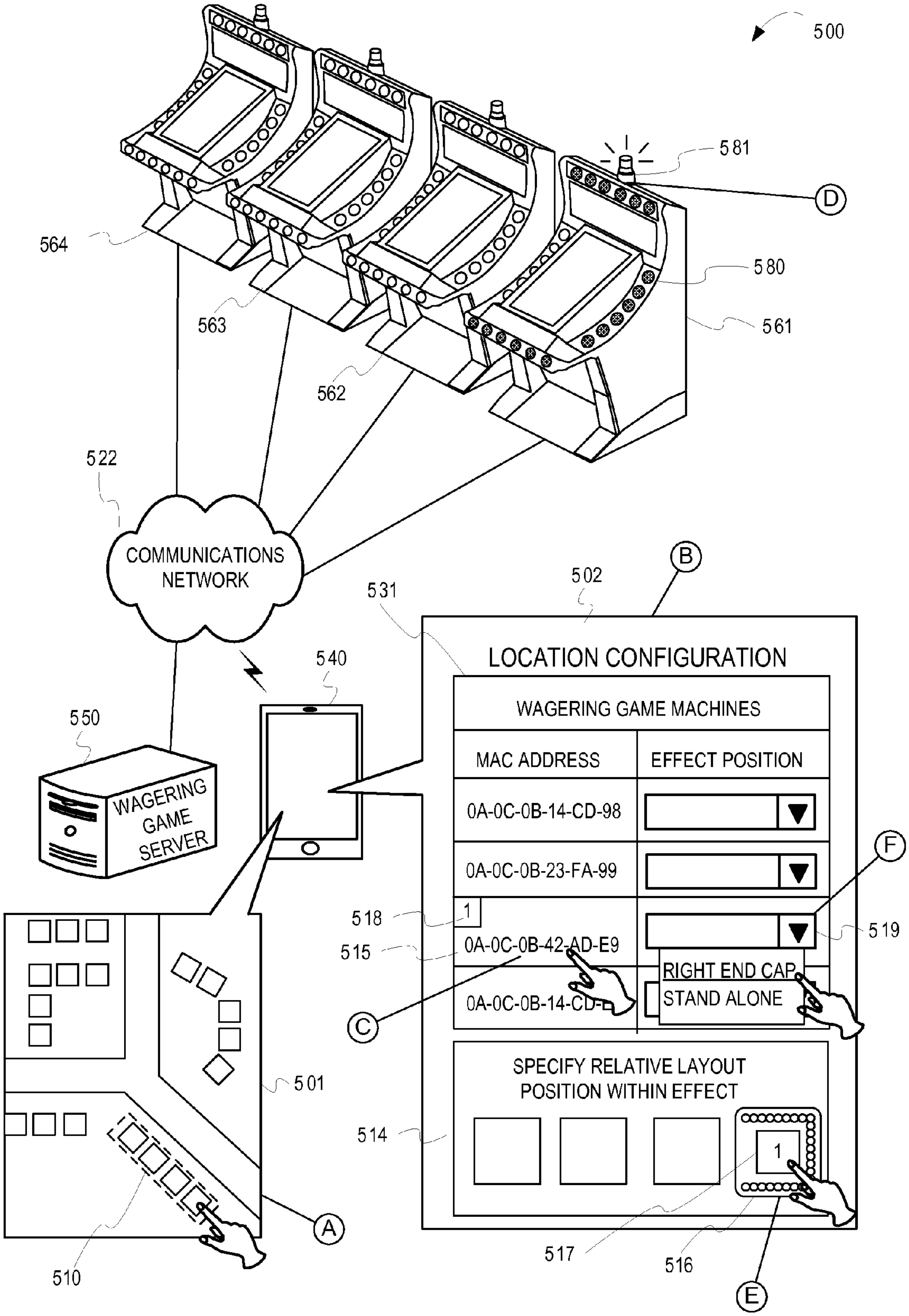
FIG. 5 is an illustration of remotely configuring one or more wagering game machines for a gaming effect, according to some embodiments.

In some embodiments, the system presents a chart or list of wagering game machines in a bank, such as in FIG. 5. FIG. 5 illustrates an example wagering game system ("system") 500 with wagering game machines 561, 562, 563, and 564 ("wagering game machines 561-564") connected to a communications network 522. A wagering game server 550 and a remote configuration device 540 are also connected to the communications network 522.

At a first stage "A," the system 500 detects when one or more wagering game machines are selected for configuration of a gaming effect. For instance, the system can detect when one, or more, of the wagering game machines 561-564 are selected manually for configuration (e.g., the system 500 detects as each of the wagering game machines 561-564 is manually scanned, as described previously). In another example, the system presents, via the remote configuration device 540, a first configuration console 501 with a map of a casino floor. The map, in some embodiments, is a video or photographic overhead view or an animated/graphical representation of wagering game machines on the casino floor. On the map of the casino floor are groupings of wagering game machines. The system 500 can detect that an operator selects a group (e.g., bank 510) of wagering game machines. The bank 510 refers to the wagering game machines 561-564.

At stage "B," after the system 500 detects a selection of one or more of the wagering game machines 561-564 to be configured (e.g., after selection of wagering game machines 561-564 via the first configuration console 501 or via manual selection), the system 500 presents, via the remote configuration device 540, a second configuration console 502. In the second configuration console 502, the system 500 presents a listing of the wagering game machines 561-564 labeled by name, number, identifier, etc. For example, the second configuration console 502 presents a list 531 that shows media access control (MAC) addresses assigned to each of the wagering game machines 561-564. An order of the wagering game machines 561-564 is presented on the list 531, however, the order does not necessarily represent a spatial ordering of the wagering game machines 561-564 on the casino floor. Instead, the list 531 presents a textual listing of the wagering game machines 561-564 ordered in descending order relative to how the machines are connected together in a series. For example, the remote configuration device 540 detects that the wagering game machines 561-564 have been physically wired as a bank unit. The remote configuration device presents the list 531 with the list of MAC addresses ordered according to the order that the wagering game machines 561-564 were wired. However, the wiring may have been connected in such a way that the order of the list 531 does not correspond to the order of the wagering game machines 561-564 from left to right, or right to left. In other words, the wagering game machines 561-564 may have been wired together out of a required order for proper presentation of a synchronized gaming effect. Therefore, the second configuration console 502 provides ways to correctly order the presentation of the synchronized effect. For instance, the second configuration console 502 presents a graphical layout 514 that represents how the gaming effect would appear via the machines 561-564.

At stage, "C," the system 500 detects when an operator selects one of the MAC addresses (i.e., MAC address 515) from the list 531. The MAC address 515 corresponds to the wagering game machine 561.

At stage "D," the system 500 presents a visual indicator to show which of the wagering game machines 561-564 was selected (e.g., the system 500 causes the candle 581 to light up on the wagering game machine 561).

At stage "E," the system 500 prompts the operator to select, from the layout 514, where the wagering game machine 561 is positioned within the graphical objects of the layout 514. For example, the system 500 detects that the operator selects a far-right object 516. Further, the system 500 assigns, and presents, a first numerical identifier 517 to the object 516. The first numerical identifier 517 represents a first node in a synchronized gaming effect. The system 500 further presents a second numerical identifier 518 that corresponds, in value, to the first numerical identifier 517. In some embodiments, the system 500 can dynamically rearrange (e.g., sort) the order of the list 531 (e.g., the system 500 moves the entry for the MAC address 515 upward to the top entry in the list 531 or to the bottom entry in the list 531 as an indication that the entry corresponds to a far-right or far-left node).

At stage "F," the system 500 provides options for a configuration control 519 to configure the wagering game machine 561. FIG. 5 will be referred to again further below.

Returning momentarily to FIG. 3, the flow 300 continues at processing block 306 where the system evaluates a position of the wagering game machine against criteria for presentation of the wagering game effect. In some embodiments, the system criteria is related to one or more additional wagering game machines that have already been configured for the wagering game effect. For instance, the system can evaluate a location of a wagering game machine to another wagering game machine that has already been configured. In FIG. 1, at stage "B," the system 100 evaluated the location of the wagering game machine 162 relative to the location of the wagering game machine 161 which had already been configured at stage "A."

In another example, the criteria for the wagering game effect is related to characteristics of a casino floor (e.g., confines or borders of a casino floor's layout). For instance, the system can evaluate a location of the wagering game machine to the confines of a casino floor and determine rules, or conditions, related to how, when, and where the gaming effect should be presented at the wagering game machine relative to its location on a casino floor. For example, criteria may specify that a wagering game machines near a major walkway of the casino floor cannot be configured for standalone mode if the machine is in a bank.

In yet another example, the criteria for the wagering game effect relates to characteristics of a bank (e.g., to an orientation of the bank, to a position of the bank, to a number of devices in a bank, to a shape of the bank, etc.). For instance, the system can evaluate a position of the wagering game machine relative to a shape of a bank and determine rules, or conditions, related to how, when, and where the gaming effect should be presented at the wagering game machine based on the shape of the bank. For example, criteria may specify that a wagering game machine in a bank with a circular pattern cannot be configured in stand-alone mode.

The flow 300 continues at processing block 308 where, based on the evaluating the position of the wagering game machine against the criteria for the presentation of the wagering game effect, the system automatically adapts an availability of at least one of the plurality of options to configure the wagering game machine. For instance, after the system evaluates the position of the wagering game machine against the criteria for the presentation of the wagering game effect, the system sets, modifies, enables, disables, etc. options of a configuration console. On the configuration console, the system presents options available for the currently configured wagering game machine according to criteria for presentation of the wagering game effect. For instance, in some embodiments, the criteria is that the wagering game effect should either be presented on only one machine (as a stand-alone) or as part of a synchronized presentation (e.g., as one node in a series of presentation nodes for the wagering game effect that can span presentation across the multiple wagering game machines), as similarly described in FIG. 1. In the example of FIG. 5, at stage "F," when the system 500 provides options for the configuration control 519, the system 500 can detect that the wagering game machine 561 is the first to be configured amongst the wagering game machines 561-564. The system 500, therefore, provides a limited number of options in the dropdown menu of the configuration control 519 (e.g., the system 500 provides options to only configure the wagering game machine 561 as either a right endcap node of a bank mode or as a solitary node of standalone mode). If the wagering game machine 561 is configured as a right endcap node, the system 500 causes the object 516 to take on an appearance of a right endcap. The system 500 can provide a test pattern (e.g., the system 500 illuminates emotive lights 580 to show that wagering game machine 561 has been configured as a right endcap node).

Returning again to the description of processing block 308 of FIG. 3, in some embodiments, the system automatically modifies the availability of the at least one of the options based on whether a second wagering game machine, of the plurality of wagering game machines, has previously been configured (i.e., if a second wagering game machine has been assigned an order in a synchronized pattern for the presentation of the wagering game effect). For instance, if the system determines that a second wagering game machine in a bank has previously been configured for the presentation of the wagering game effect, the system can disable an options for a wagering game machine currently being configured ("currently configured wagering game machine"). The system, for example, disables an option to configure the currently configured wagering game machine as a beginning node in the sequential order of presentation of the wagering game effect because the second wagering game machine has already been selected as the beginning node. In another example, if no other machine besides the currently configured wagering game machine has been configured yet for the wagering game effect (i.e., if the currently configured wagering game machine is the first of the plurality of wagering game machines to be configured for the wagering game effect), the system disables an option to make the currently configured wagering game machine a terminating node (e.g., closing end-cap) in a sequential order of the wagering game effect because a beginning node has not yet been set. In another example, if a second wagering game machine has been selected as one of two possible end-cap nodes (e.g., a "right" endcap node) and a third wagering game machine has been selected as a second of the two possible end-cap nodes (e.g., a "left" endcap node), then the system can remove the options for the end-caps and only provide options for a middle node.

In some embodiments, the system modifies the availability of the at least one option based the location of the currently configured wagering game machine relative to confines of a casino floor or confines of a bank (e.g., the position in a certain location in the casino, a location within the bank) according to the criteria of the wagering game effect. For example, if the currently configured wagering game machine is at an edge of a layout of the bank of wagering game machines (i.e., if there is no neighboring wagering game machine to one side of the currently configured wagering game machine), then the system can remove options to make the wagering game machine a "middle" node. The system would provide only the options to make the currently configured wagering game machine an end-cap node (e.g., either a beginning or terminating node) or a stand alone node.

Figure 6:
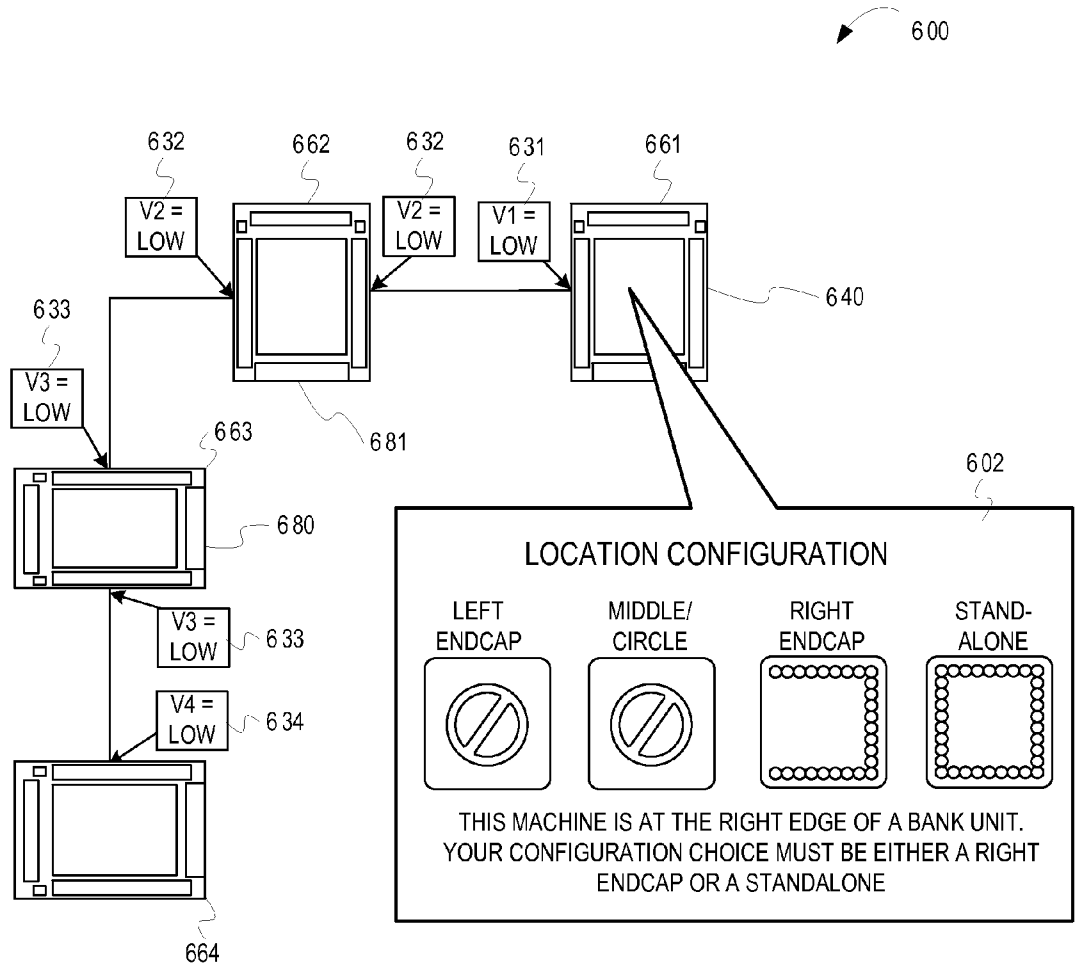
FIG. 6 is an illustration of configuring a gaming effect for one or more wagering game machines connected in series, according to some embodiments.

In some embodiments, the system modifies the availability of the at least one option based on the location of the currently configured wagering game machine relative to a location of others of the wagering game machines according to the criteria of the wagering game effect. In one example, the system detects one or more signals from one or more additional wagering game machine adjacent to the currently configured wagering game machine. Based on a value of the signal, the system automatically modifies the availability of at least one of the options. FIG. 6 illustrates an example of a wagering game system ("system") 600 with a bank of wagering game machines 661, 662, 663, and 664 ("wagering game machines 661-664"). The wagering game machines 661-664 are connected in series such that each of the wagering game machines may communicate a signal (e.g., a high or low voltage, magnetic signal, radio signal, infrared signal, near-field communication signal, etc.) to its neighboring wagering game machine within the bank. The signal can indicate to its neighboring wagering game machine whether the wagering game machine has already been configured for the gaming effect in a bank mode. Based on the signal, the system 600 can predict a potential configuration setting for the currently configured wagering game machine based on the value. For example, in FIG. 6, wagering game machine 661 presents a signal 631, which can be detected by wagering game machine 662. Wagering game machine 662 presents a signal 632, which can be detected by wagering game machines 661 and 663. Wagering game machine 663 presents a signal 633, which can be detected by wagering game machines 662 and 664. Wagering game machine 664 presents a signal 634, which can be detected by wagering game machine 663.

Figure 7:
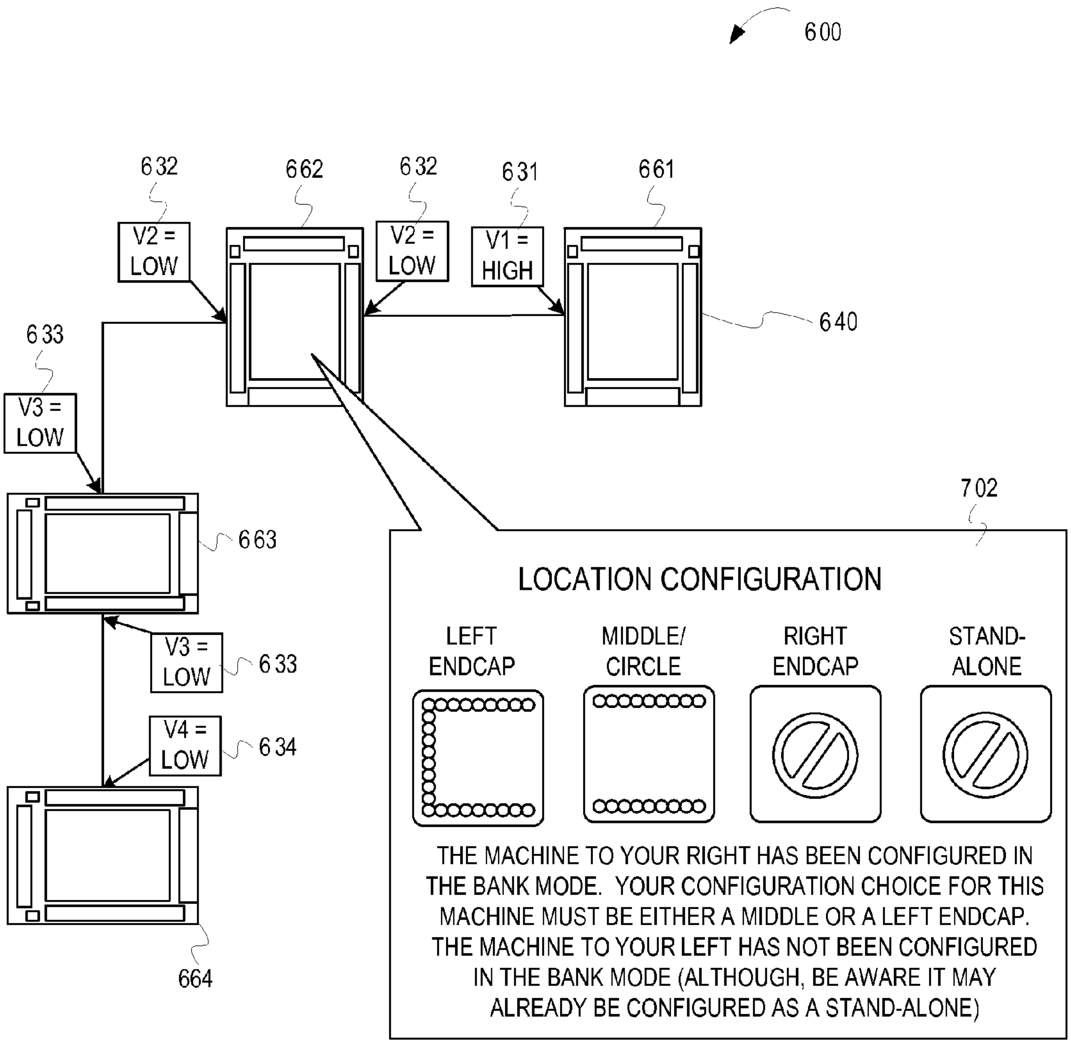
FIG. 7 is an illustration of configuring a gaming effect for one or more wagering game machines connected in series, according to some embodiments.

The system 600 presents a configuration console 602 during the configuration of wagering game machine 661. The wagering game machine 661 reads the signal 632 and determines that it is a low voltage, meaning that wagering game machine 662 has not yet been configured for a gaming effect in a bank mode. The wagering game machine 661 can also detect that there is no voltage on its right side 640 and, therefore, it is at the right end of a bank. Consequently, in the configuration console 602, the system 600 provides options to configure the wagering game machine 661 as either a stand-alone machine or as a right endcap node of the bank mode. After wagering game machine 661 is configured, the signal 631 indicates a different voltage level, such as a high voltage, as shown in FIG. 7. The high voltage indicates that the wagering game machine 661 has been configured in a bank mode. When wagering game machine 662 is being configured, a configuration console 702 is presented. The wagering game machine 662 detects that the signal 633 is low and, therefore, wagering game machine 663 has not been configured in the bank mode. The options in the configuration console 702 are adapted, at least in part, based on the signal 631 showing a high voltage level and the signal 633 showing a low voltage level. For example, the configuration console 702 presents options to either configure wagering game machine 662 as either a middle node or a left endcap node. The configuration console 702 also provides a notification that it is unknown whether wagering game machine 633 was configured in stand-alone mode. If wagering game machine 633 were configured in stand-alone mode, then the wagering game machine 662 should be configured as a left encap node, to close the loop of the particular gaming effect.

In some embodiments, the signals 631, 632, 633, and 634 may have more than binary levels (e.g., a first signal value indicates configuration in a bank mode as an endcap, a second signal value indicates configuration as a middle node, a third signal value indicates a configuration in a stand-alone mode, and a fourth level indicates non-configuration). Therefore, in FIG. 7, if the system 600 could determine that wagering game machine 661 was configured as a right endcap node (e.g., signal 631 is at the first level and is to the right of wagering game machine 662) and that wagering game machine 663 was configured as a left endcap node (e.g., signal 633 is at the first signal level and is to the left of wagering game machine 662), then the system 600 can predict that the wagering game machine 662 should be configured as a "middle" node for the wagering game effect.

The system 600 can further detect an orientation or location of wagering game machines. For example, in FIG. 7, when the wagering game machine 662 is being configured, the system 600 detects an orientation of the wagering game machine 663. For example, if the wagering game machine 663 was positioned in a way such that a front 680 of the wagering game machine 663 and a front 681 of the wagering game machine 662 could not both be seen from the same perspective, then the system 600 can predict that a gaming effect would not appear to flow properly when seen from that perspective. Thus, the configuration console 702 could provide only the option to make the wagering game machine 662 a left endcap node.

Further, the system 600 can refer to conditions associated with the wagering game effect. For example, the wagering game effect may include a configuration file that indicates that there should be at least a given number of wagering game machines in the series for the effect to be presented properly (e.g., for a wagering game feature that is supposed to include at least three eligible wagering game machines for the feature), then the system 600 can determine that the wagering game machine 662 should be configured as a "middle" node, and therefore disable the option to make the wagering game machine 662 a left end-cap node.

Referring back to the description of processing block 308 of FIG. 3, in some embodiments, the system automatically modifies the availability of at least one of the options based both a configuration of an additional wagering game machine ("second wagering game machine") that was previously configured in the bank and on a position or orientation of the currently configured wagering game machine relative to the second wagering game machine. The system can determine that the second wagering game machine was configured, evaluate a first orientation of a first presentation device of the currently configured wagering game machine to a second orientation of a second presentation device of the second wagering game machine, and determine, based on the evaluation, that a presentation of the wagering game effect from the currently configured wagering game machine would not be perceptible (e.g., viewable or hearable) from a perspective of the second wagering game machine. For example, the system may determine that the criteria requires the presentation of the wagering game effect to be seen or heard from a single point of view of a single observer. However, if the currently configured wagering game machine and the second wagering game machine are oriented to be facing away from each other (e.g., back to back), or in some other way that the wagering game effect could not be seen from the single point of view, the system may generate options for the single wagering game machine that discounts the second wagering game machine as being part of the wagering game effect. For example, if the currently configured wagering game machine and the second wagering game machine are back to back, and the second wagering game machine was previously configured to be an end cap of the wagering game effect, then the system would consider the configuration of the currently configured wagering game machine to be for a second, separate, or independent, instance of the wagering game effect. The system would then present all available options for initially configuring the currently configured wagering game machine for the second instance of the wagering game effect.

In some embodiments, the system can further detect a selection of an available one of the plurality of options and indicate an identifier for the wagering game machine according to a position in for the wagering game effect. For example, after the system detects that a configuration setting has been set for the currently configured wagering game machine, the system can identify the relationship of the currently configured wagering game machine to the presentation order for the wagering game effect. For instance, the system can indicate an ordinal number (e.g., the number "1" if the currently configured wagering game machine has been selected as a beginning node, a next sequential number according to a number of others of the wagering game machines have been selected and configured, a textual identifier indicating it as an "end cap", etc.). The system can also present a graphical representation of how the portion of wagering game effect would be presented on the currently configured wagering game machine (e.g., present an indication of how a portion of the wagering game should appear to span, or flow, etc. via the currently configured wagering game machine based on its nodal position within the ordered sequence). In another example, if the currently configured wagering game machine is selected as an end-cap node, a graphic that represents the currently configured wagering game machine can show a vertical emotive light panel with two horizontal emotive light panels on top and bottom. On the other hand, if the currently configured wagering game machine is selected as a middle node, a graphic that represents the currently configured wagering game machine can show only an emotive light panel on the top or bottom of the graphic.

In some embodiments, the system can further detect that a position of the wagering game machine moves or that a wagering game machine has been turned off (or disabled) and remove a setting for the configuration of the wagering game machine in the wagering game effect or clear all settings for the wagering game effect.

Figure 8:
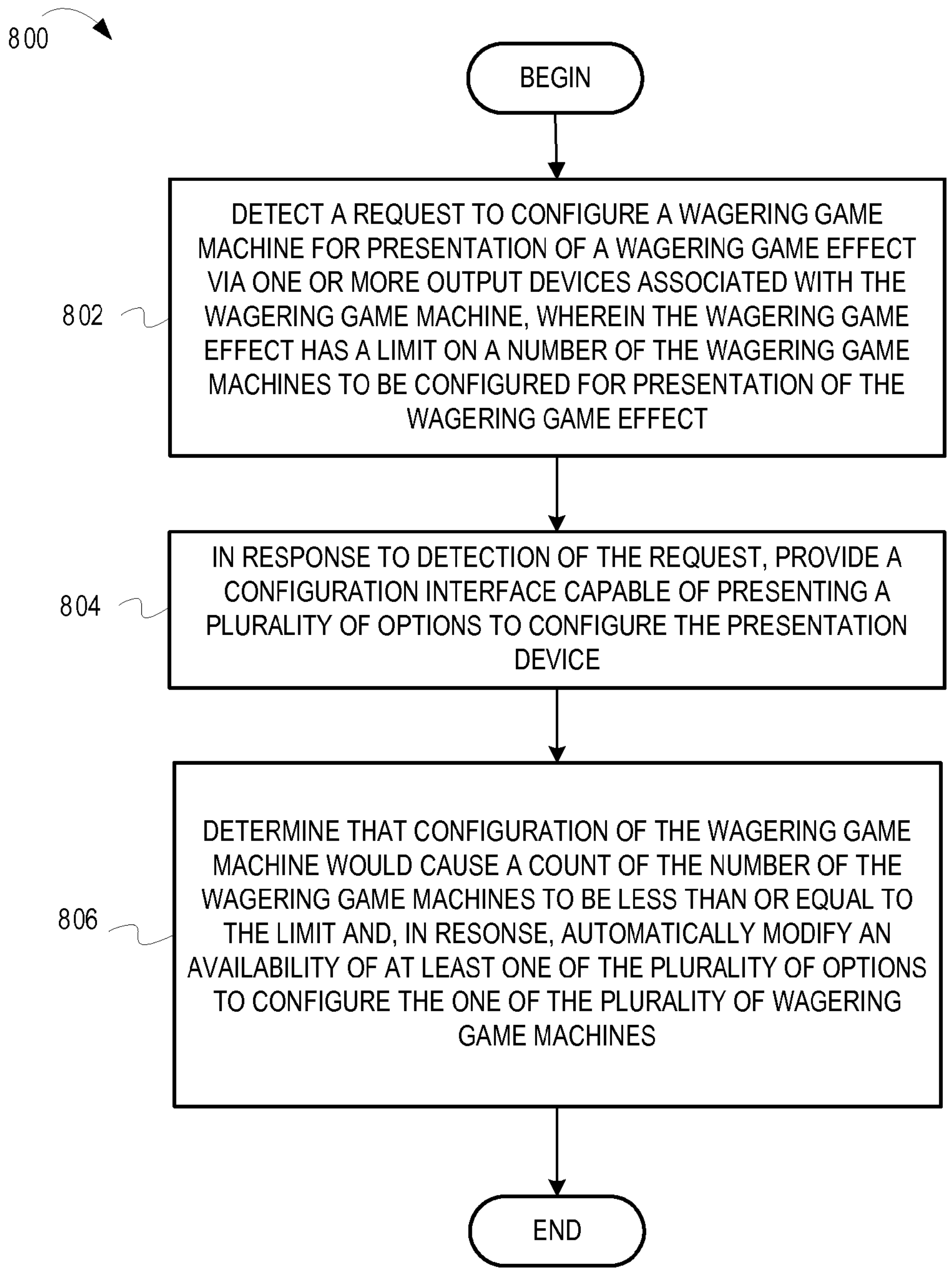
FIG. 8 is a flow diagram 800 illustrating dynamically adjusting configuration options for a gaming effect for presentation via one or more wagering game machines, according to some embodiments.
Figure 9:
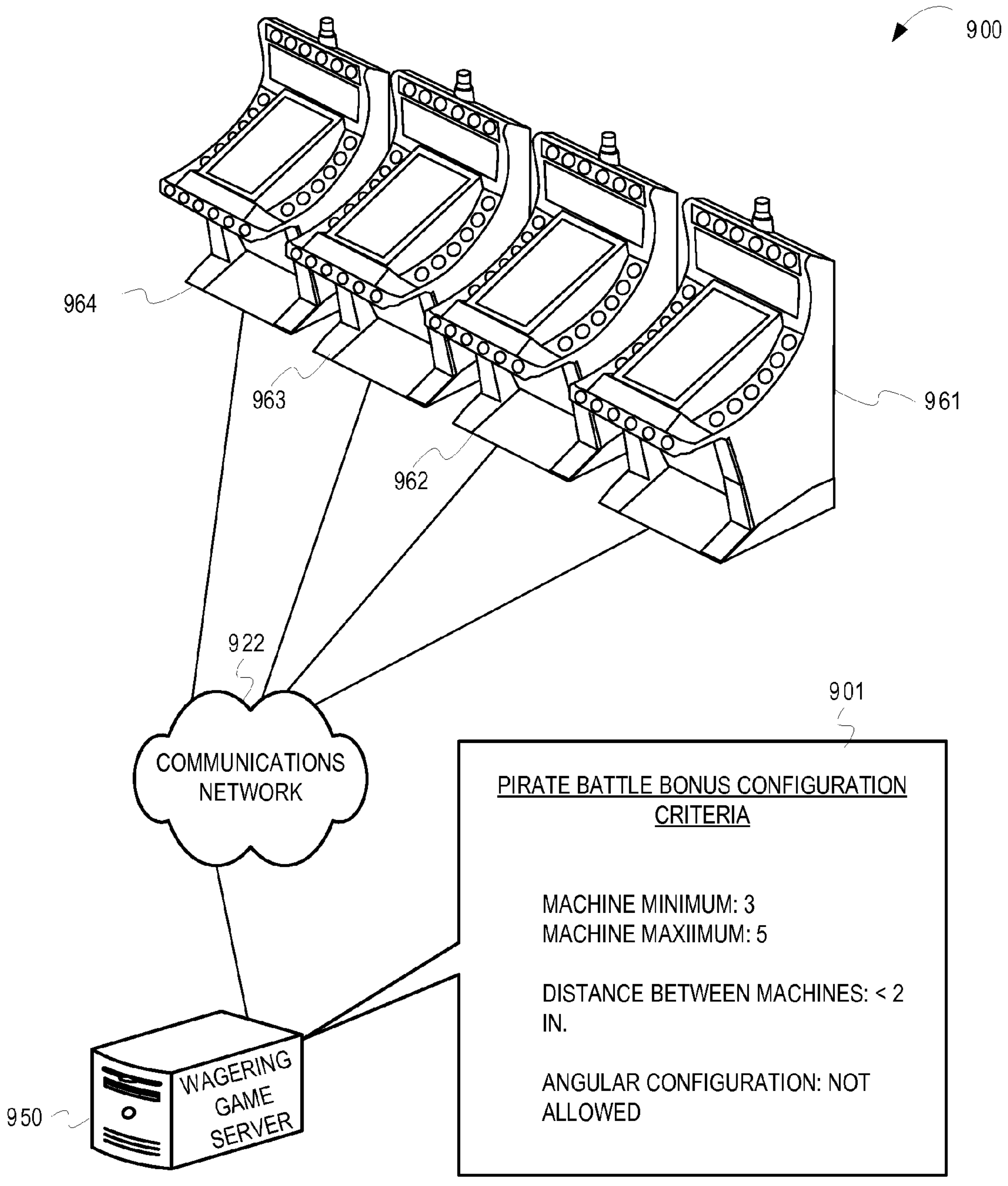
FIG. 9 is an illustration of detecting criteria for a gaming effect for presentation via one or more wagering game machines, according to some embodiments.
Figure 10:
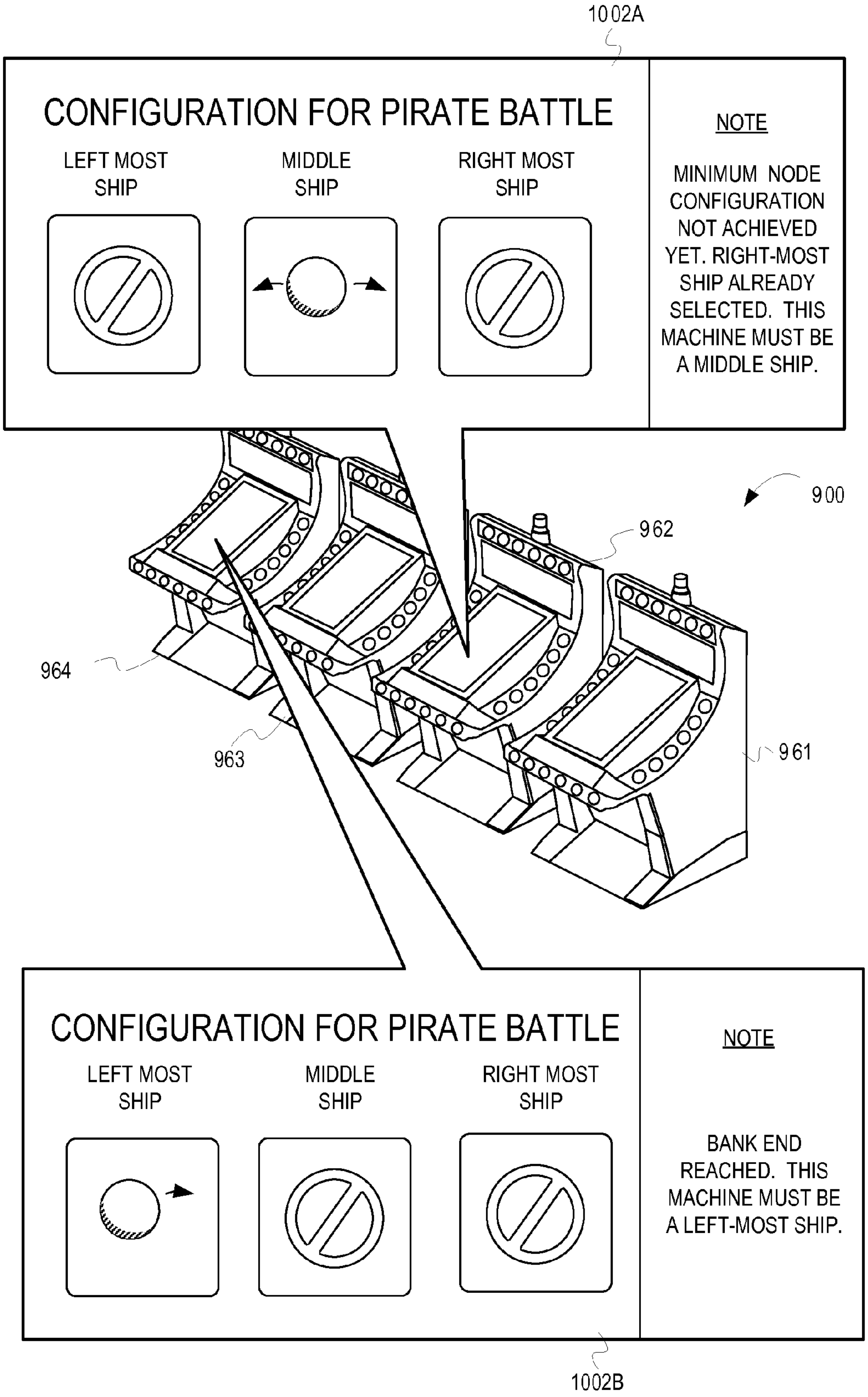
FIG. 10 is an illustration of dynamically adjusting configuration options for a gaming effect for presentation via one or more wagering game machines, according to some embodiments.

FIG. 8 is a flow diagram ("flow") 800 illustrating dynamically adjusting configuration options for a gaming effect for presentation via one or more wagering game machines, according to some embodiments. FIGS. 9 and 10 are conceptual diagrams that help illustrate the flow of FIG. 8, according to some embodiments. This description will present FIG. 8 in concert with FIGS. 9 and 10. In FIG. 8, the flow 800 begins at processing block 802, where a wagering game system ("system") detects a request to configure a wagering game machine for presentation of a wagering game effect via one or more output devices associated with the wagering game machine, wherein the wagering game effect has a limit on a number of the wagering game machines to be configured for presentation of the wagering game effect. For example, in FIG. 9, a wagering game system ("system") 900 includes a wagering game machines 961, 962, 963 and 964 ("wagering game machines 961-964"). The wagering game machines 961-964 are connected to a communications network 922. A wagering game server 950 is also connected to the communications network 922. The wagering game server 950 is a remote configuration device to configure wagering game machines 961-964 for a wagering game effect used in a wagering game feature (i.e., a bonus game that enacts a battle between pirate ships, where each of the wagering game machines 961-964 can be considered one of the pirate ships involved in the battle). The wagering game server 950 stores criteria 901 related to the configuration for the game feature. For example, the criteria 901 specifies that, for the game feature, a minimum of three wagering game machines needs to be configured and a maximum of five wagering game machines can be configured. The criteria 901 may also specify that wagering game machines configured for the game feature cannot be more than two inches away from each other and that the wagering game machines cannot be arranged in an angular fashion (e.g., the wagering game machines must be in a straight line and facing in the same direction).

The flow 800 continues at processing block 804, where, in response to detection of the request, the system provides a configuration interface capable of presenting a plurality of options to configure the presentation device. For example, in FIG. 10 the wagering game machine 962 presents a configuration console 1002A to configure the wagering game machine 962 for the game feature.

The flow 800 continues at processing block 806, where the system determines that configuration of the wagering game machine would cause a count of the number of the wagering game machines to be less than or equal to the limit and, in response, automatically modifies an availability of at least one of the plurality of options to configure the one of the plurality of wagering game machines. For example, in FIG. 10, the system 900 detects that the wagering game machine 961 has already been configured for the game feature as a right-most ship node in the pirate battle bonus game. Further, the system 900 detects, from analysis of the criteria 901, that at least two wagering game machines must be configured but only one wagering game machine (i.e., wagering game machine 961) has been configured. Therefore, the system 900 presents, via the configuration console 1002A, options that indicate that the wagering game machine 962 must be a middle ship because the minimum number of nodes has not yet been met. Further, when the wagering game machine 964 is configured, the system 900 presents a configuration console 1002B. The system 900 detects that wagering game machines 961, 962, and 963 have been configured for the game feature. The system 900 further detects that there are no more wagering game machines in the bank to configure (i.e., wagering game machine 964 is the last of the four wagering game machines 961-964). The system 900 also detects that although the criteria 901 indicates that no more than five wagering game machines can be utilized for the game feature, because there are only four wagering game machines 961-964, then the options in the configuration console 1002B adapt to indicate that wagering game machine 964 must be a left-most ship node.

Example Operating Environments

This section describes example operating environments, systems, networks, etc. and presents structural aspects of some embodiments.

Wagering Game System Architecture

Figure 11:
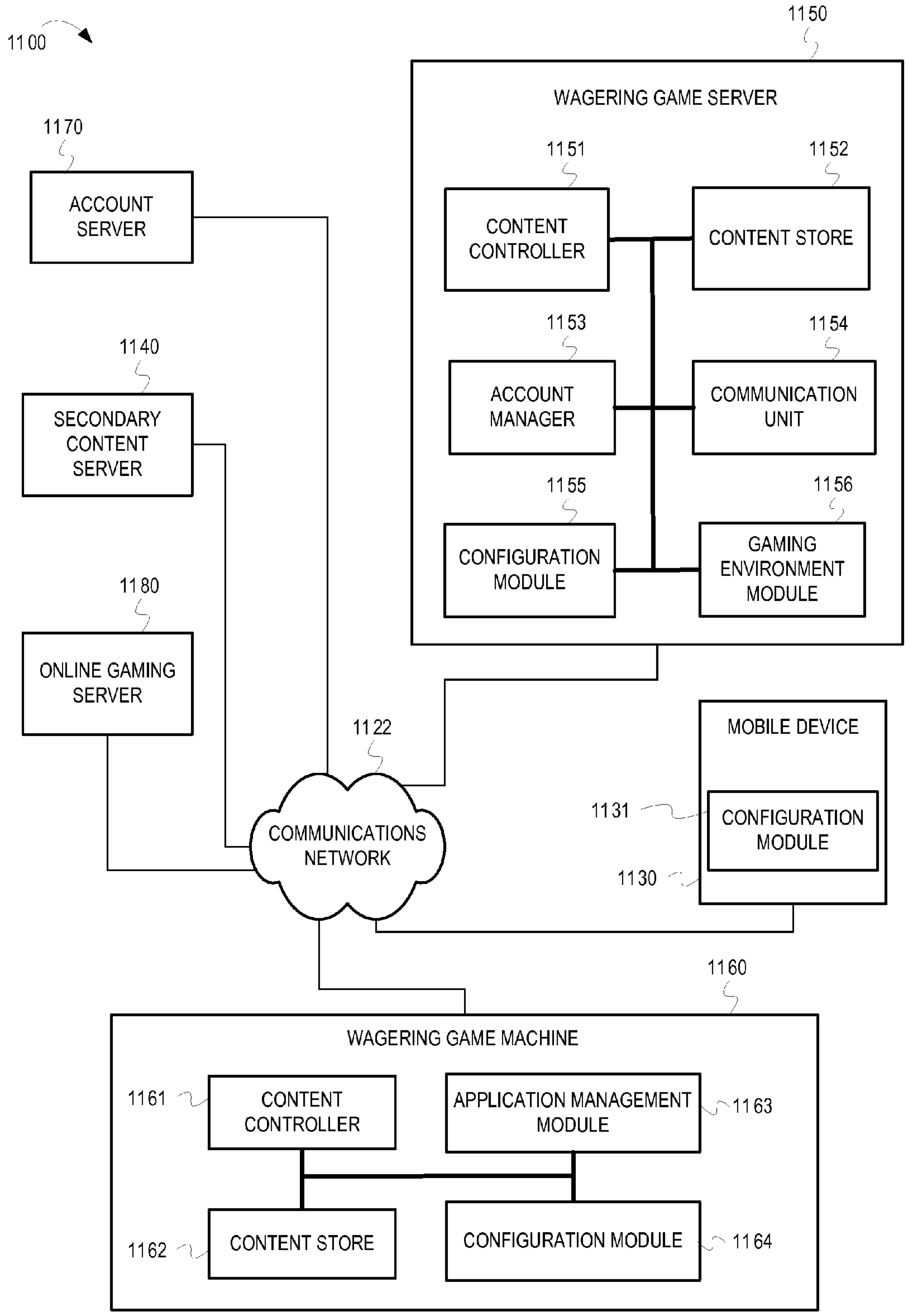
FIG. 11 is an illustration of a wagering game system architecture 1100, according to some embodiments.

FIG. 11 is a conceptual diagram that illustrates an example of a wagering game system architecture 1100, according to some embodiments. The wagering game system architecture 1100 can include an account server 1170 configured to control user related accounts accessible via wagering game networks and social networking networks. The account server 1170 can store wagering game player account information, such as account settings (e.g., settings related to group games, etc., settings related to social contacts, etc.), preferences (e.g., player preferences regarding content presentable via an application of a mobile device, player preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 1170 can contain lists of social contacts referenced by a player account. The account server 1170 can also provide auditing capabilities, according to regulatory rules. The account server 1170 can also track performance of players, machines, and servers.

The wagering game system architecture 1100 can also include a wagering game server 1150 configured to control wagering game content, provide random numbers, and communicate wagering game information, account information, and other information to and from a wagering game machine 1160. The wagering game server 1150 can include a content controller 1151 configured to manage and control content for presentation on the wagering game machine 1160. For example, the content controller 1151 can generate game results (e.g., win/loss values), including win amounts, for games played on the wagering game machine 1160. The content controller 1151 can communicate the game results to the wagering game machine 1160. The content controller 1151 can also generate random numbers and provide them to the wagering game machine 1160 so that the wagering game machine 1160 can generate game results. The wagering game server 1150 can also include a content store 1152 configured to contain content to present on the wagering game machine 1160. The wagering game server 1150 can also include an account manager 1153 configured to control information related to player accounts. For example, the account manager 1153 can communicate wager amounts, game results amounts (e.g., win amounts), bonus game amounts, etc., to the account server 1170. The wagering game server 1150 can also include a communication unit 1154 configured to communicate information to the wagering game machine 1160 and to communicate with other systems, devices and networks. The wagering game server 1150 can also include a configuration module 1155 configured to configure the wagering game machine 1160 for presentation of a gaming effect capable of presentation via a bank of wagering game machines. The wagering game server 1150 can also include a gaming environment module 1156 configured to present environmental light and sound effects in a casino environment. The gaming environment module 1156 is further configured to provide content data, user data, and control information regarding gaming effects within a casino environment. For example, the gaming environment module 1156 can coordinate a synchronized presentation of lighting and sound effects across a bank of wagering game machines and/or other lighting and sound producing devices within one or more areas of a casino. The gaming environment module 1156 can also be configured to detect gaming events, such as events generated by the wagering game server 1150 and/or the wagering game machine 1160. The gaming environment module 1156 can generate data for a synchronized light/sound show based on the gaming events. The gaming environment module 1156 can control environmental light presentation devices within a casino. The gaming environment module 1156 can provide emotive lighting presentation data, including light presentation commands on emotive lighting devices on or near wagering game machines, as well as other devices within the casino such as spotlights, overhead emotive lighting, projectors, etc. The gaming environment module 1156 can be configured to determine multi-media, casino-content, including casino-wide special effects that include sound effects and light effects. The multi-media casino content can be presentable across a plurality of casino content presentation devices ("presentation devices") in a casino. The multi-media, casino-content effect can be related to a wagering game presentation or event. The wagering game presentation or event can be tied to the functionality, activity, or purpose of a wagering game. For instance, wagering game presentations can be related to attracting wagering game players to groups of wagering game machines, presenting game related outcomes across multiple wagering game machines, expressing group gaming activity across multiple wagering game machines, focusing attention on a particular person or machine in response to a gaming event, etc. The presentation devices present sound and light effects that accompany a gaming event (e.g., a jackpot celebratory effect that focuses on a wagering game machine, a lightning strike that introduces a community gaming event, and a musical chair game that reveals a community wagering game winner). The gaming environment module 1156 can also be configured to determine timing control data for the multi-media effect. In some embodiments, timing control data can be stored on the wagering game server 1150, or be accessible to the gaming environment module 1156 via another device (e.g., a lighting controller associated with a bank of wagering game machines), to use to send lighting commands in sequential order to network addresses of presentation device on a casino network. The gaming environment module 1156 can determine channels assigned with casino-content presentation devices, such as the wagering game machine 1160. In some embodiments, the presentation devices can have addresses assigned to a channel. For example, the wagering game machine 1160 could be on one channel, peripheral devices could be on another channel, network light presentation devices can be on other channels, etc. In some embodiments, the gaming environment module 1156 can be a DMX controller connected in parallel to an emotive lighting controller on, or associated with, the wagering game machine 1160. The DMX controller can also be connected in parallel to a plurality of other presentation devices (e.g., other wagering game machines, lighting presentation devices, etc.) within a casino, and can simultaneously provide DMX lighting commands to the wagering game machine 1160 and to the other presentation devices. DMX can change light intensity, or other light characteristics, over time. Some embodiments of DMX controllers can update commands very quickly (e.g., thirty to forty-seven times a second) across multiple channels (e.g., five-hundred and twelve channels). A DMX controller can put different commands in every channel (e.g., one channel can have show "X," one channel can have show "Y," etc.). The DMX can also have a frame number within a show. Some devices can take up more than one channel (e.g., an emotive light might have three colors and may take up a channel for each color, a spotlight might have seven channels, etc.). Each device can receive five-hundred and twelve (512) bytes of data from the DMX controller at any given time interval (e.g., frame). The five-hundred and twelve bytes of data can be divided in different ways. For example, six bytes may address light effect behavior, six bytes may include show numbers, six bytes may include frame numbers, one byte may include priority values, and so on for various light effect characteristics (e.g., intensity, color, pan, tilt, etc.). The presentation device that receives the DMX command data is programmed to interpret the lighting data in the channel. In some embodiments, the presentation devices can be DMX compliant including having a DMX input port to accept DMX commands. In some embodiments, presentation devices can convert the DMX commands to proprietary commands. In addition to the DMX protocol, other types of dedicated lighting protocols can include AMX-192, CMX, SMX, PMX, protocols included in the EIA-485 standard, etc.

The wagering game system architecture 1100 can also include the wagering game machine 1160 configured to present wagering games and receive and transmit information between the wagering game machine 1160 and the mobile device 1130. The wagering game machine 1160 can include a content controller 1161 configured to manage and control content and presentation of content on the wagering game machine 1160. The wagering game machine 1160 can also include a content store 1162 configured to contain content to present on the wagering game machine 1160. The wagering game machine 1160 can also include an application management module 1163 configured to manage multiple instances of gaming applications. For example, the application management module 1163 can be configured to launch, load, unload and control applications and instances of applications. The application management module 1163 can launch different software players (e.g., a Microsoft® Silverlight™ player, an Adobe® Flash® player, etc.) and manage, coordinate, and prioritize what the software players do. The application management module 1163 can also coordinate instances of server applications in addition to local copies of applications. The application management module 1163 can control window locations on a wagering game screen or display for the multiple gaming applications. In some embodiments, the application management module 1163 can manage window locations on multiple displays including displays on devices associated with and/or external to the wagering game machine 1160 (e.g., a top display and a bottom display on the wagering game machine 1160, a peripheral device connected to the wagering game machine 1160, a mobile device connected to the wagering game machine 1160, etc.). The application management module 1163 can manage priority or precedence of client applications that compete for the same display area. For instance, the application management module 1163 can determine each client application's precedence. The precedence may be static (i.e. set only when the client application first launches or connects) or dynamic. The applications may provide precedence values to the application management module 1163, which the application management module 1163 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 1163 of its current presentation state. The applications may provide presentation state values to the application management module 1163, which the application management module 1163 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 1163 can be pre-configurable. The system can provide controls and interfaces for operators to control screen layouts and other presentation features for the configuring of the application management module 1163. The application management module 1163 can communicate with, and/or be a communication mechanism for, a base game stored on a wagering game machine. For example, the application management module 1163 can communicate events from the base game such as the base game state, pay line status, bet amount status, etc. The application management module 1163 can also provide events that assist and/or restrict the base game, such as providing bet amounts from secondary gaming applications, inhibiting play based on gaming event priority, etc. The application management module 1163 can also communicate some (or all) financial information between the base game and other applications including amounts wagered, amounts won, base game outcomes, etc. The application management module 1163 can also communicate pay table information such as possible outcomes, bonus frequency, etc. In some embodiments, the application management module 1163 can control different types of applications. For example, the application management module 1163 can perform rendering operations for presenting applications of varying platforms, formats, environments, programming languages, etc. For example, the application management module 1163 can be written in one programming language format (e.g., JavaScript, Java, C++, etc.) but can manage, and communicate data from, applications that are written in other programming languages or that communicate in different data formats (e.g., Adobe® Flash®, Microsoft® Silverlight™, Adobe® Air™, hyper-text markup language, etc.). The application management module 1163 can include a portable virtual machine capable of generating and executing code for the varying platforms, formats, environments, programming languages, etc. The application management module 1163 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.).

The wagering game machine 1160 can also include a configuration module 1164 configured to configure the wagering game machine 1160 for presentation of a gaming effect capable of presentation via a bank of wagering game machines.

The wagering game system architecture 1100 can also include the secondary content server 1140 configured to provide content and control information for secondary games and other secondary content available on a wagering game network (e.g., secondary wagering game content, promotions content, advertising content, player tracking content, web content, etc.). The secondary content server 1140 can provide "secondary" content, or content for "secondary" games presented on the wagering game machine 1160. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the secondary content server 1140 can provide and control content for community games, including networked games, social games, competitive games, or any other game that multiple players can participate in at the same time. In some embodiments, the secondary content server 1140 can control and present an online website that hosts wagering games. The secondary content server 1140 can also be configured to present multiple wagering game applications on the wagering game machine 1160 via a wagering game website, or other gaming-type venue accessible via the Internet. The secondary content server 1140 can host an online wagering website and/or a social networking website. The secondary content server 1140 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 1140 can also be configured to provide content presentable via an application of the mobile device 1130. In some embodiments, the secondary content server 1140 can also host social networking accounts, provide social networking content, control social networking communications, store associated social contacts, etc. The secondary content server 1140 can also provide chat functionality for a social networking website, a chat application, or any other social networking communications mechanism. In some embodiments, the secondary content server 1140 can utilize player data to determine marketing promotions that may be of interest to a player account. The secondary content server 1140 can also analyze player data and generate analytics for players, group players into demographics, integrate with third party marketing services and devices, etc. The secondary content server 1140 can also provide player data to third parties that can use the player data for marketing. In some embodiments, the secondary content server 1140 can provide one or more social networking communication mechanisms that publish (e.g., post, broadcast, etc.) a message to a mass (e.g., to multiple people, users, social contacts, accounts, etc.). The social networking communication mechanism can publish the message to the mass simultaneously. Examples of the published message may include, but not be limited to, a blog post, a mass message post, a news feed post, a profile status update, a mass chat feed, a mass text message broadcast, a video blog, a forum post, etc. Multiple users and/or accounts can access the published message and/or receive automated notifications of the published message.

The wagering game system architecture 1100 can also include the online gaming server 1180 configured to control and present a website that hosts gaming related content (e.g., wagering games, non-wagering games that share common themes to wagering games, social networking content related to gaming, etc.). The online gaming server 1180 can be configured to present multiple applications on the website via the Internet. The online gaming server 1180 can host a social network. The online gaming server 1180 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The online gaming server 1180 can also be configured to provide content presentable via an application of a mobile device.

The wagering game system architecture 1100 can also include the mobile device 1130 configured to control mobile communications and applications. The mobile device 1130 may also be referred to as a handheld device, a handheld computer or simply handheld. In some embodiments, the mobile device 1130 is a pocket-sized computing device, having a display screen with touch input and/or a miniature keyboard. Some examples of the mobile device 1130 may include, but are not limited to, a smartphone, a personal digital assistant, a mobile computer, a mobile internet device, a portable media player, a mobile phone, a pager, a personal navigation device, etc. In some embodiments, the mobile device 1130 functions via a wireless application protocol (WAP). In some embodiments, the mobile device 1130 may include integrated data capture devices like barcode readers, radio frequency identification (RFID) readers, In-cell Optical LCD readers, and smart card readers. In some embodiments the mobile device 1130 is personal (i.e., belongs to a user), which the user can carry on their person. The mobile device 1130 can include a configuration module 1131 configured to communicate with wagering game devices, such as the wagering game server 1150, the wagering game machine 1160, the online gaming server 1180, the secondary content server 1140, and the account server 1170. In some embodiments, the configuration module 1131 is further configured to configure the wagering game machine 1160 for presentation of a gaming effect capable of presentation via a bank of wagering game machines.

Each component shown in the wagering game system architecture 1100 is shown as a separate and distinct element connected via a communications network 1122. However, some functions performed by one component could be performed by other components. For example, the wagering game server 1150 can also be configured to perform functions of the application management module 1163, and other network elements and/or system devices. Furthermore, the components shown may all be contained in one device, but some, or all, may be included in, or performed by, multiple devices, as in the configurations shown in FIG. 11 or other configurations not shown. For example, the account manager 1153 and the communication unit 1154 can be included in the wagering game machine 1160 instead of, or in addition to, being a part of the wagering game server 1150. Further, in some embodiments, the wagering game machine 1160 can determine wagering game outcomes, generate random numbers, etc. instead of, or in addition to, the wagering game server 1150.

The wagering game machines described herein (e.g., wagering game machine 1160) can take any suitable form, such as floor standing models, handheld mobile wagering game machines, bar-top models, workstation-type console models, surface computing machines, etc. Further, wagering game machines can be primarily dedicated for use in conducting wagering games.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 1100 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Wagering Game Machine Architecture

Figure 12:
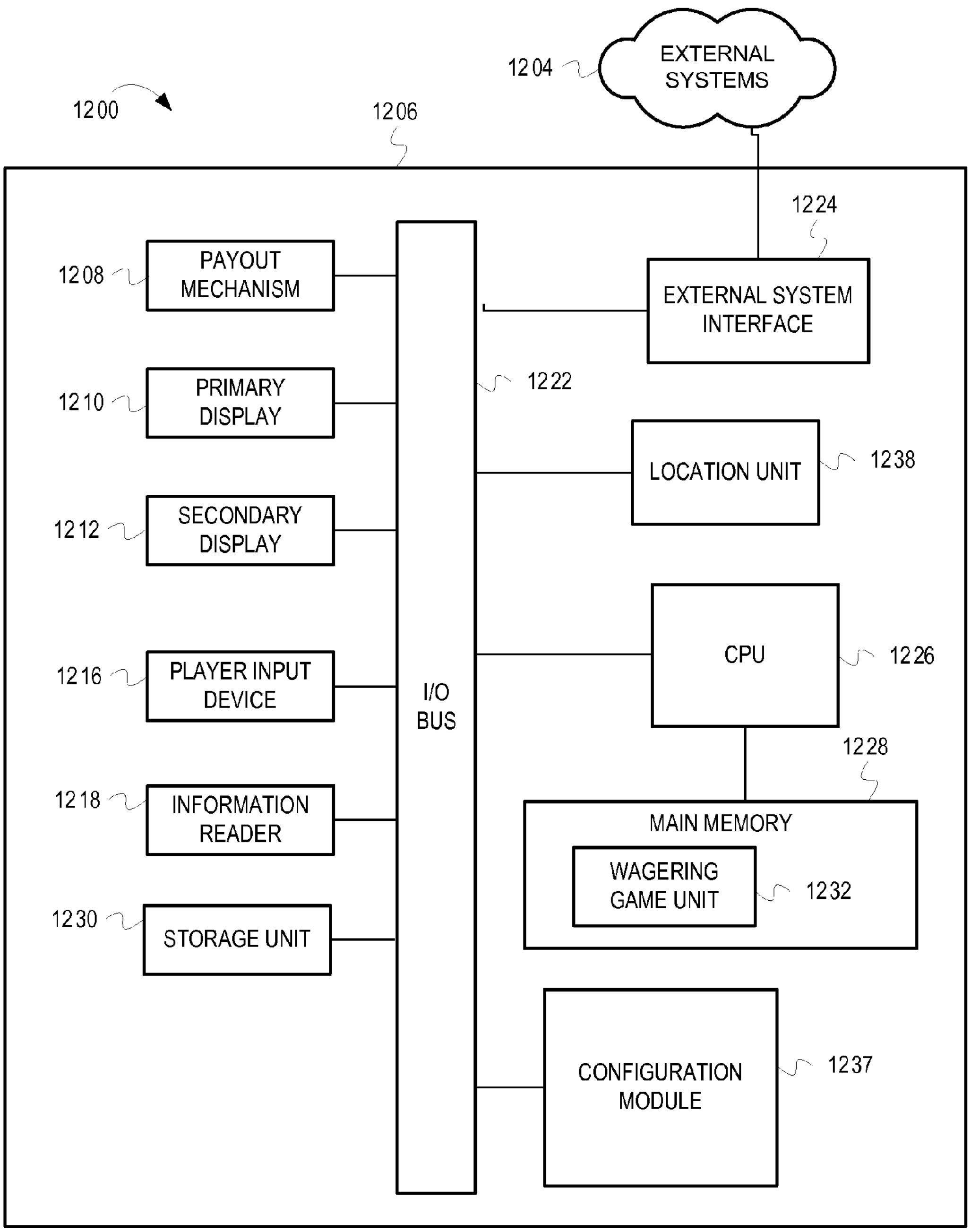
FIG. 12 is an illustration of a wagering game machine architecture 1200, according to some embodiments.

FIG. 12 is a conceptual diagram that illustrates an example of a wagering game machine architecture 1200, according to some embodiments. In FIG. 12, the wagering game machine architecture 1200 includes a wagering game machine 1206, which includes a central processing unit (CPU) 1226 connected to main memory 1228. The CPU 1226 can include any suitable processor, such as an Intel® Pentium processor, Intel® Core 2 Duo processor, AMD Opteron™ processor, or UltraSPARC processor. The main memory 1228 includes a wagering game unit 1232. In some embodiments, the wagering game unit 1232 can present wagering games, such as video poker, video black jack, video slots, video lottery, reel slots, etc., in whole or part.

The CPU 1226 is also connected to an input/output ("I/O") bus 1222, which can include any suitable bus technologies, such as an AGTL+ frontside bus and a PCI backside bus. The I/O bus 1222 is connected to a payout mechanism 1208, primary display 1210, secondary display 1212, value input device 1214, player input device 1216, information reader 1218, and storage unit 1230. The player input device 1216 can include the value input device 1214 to the extent the player input device 1216 is used to place wagers. The I/O bus 1222 is also connected to an external system interface 1224, which is connected to external systems 1204 (e.g., wagering game networks). The external system interface 1224 can include logic for exchanging information over wired and wireless networks (e.g., IEEE-802.11 transceiver, Bluetooth transceiver, Ethernet transceiver, etc.)

The I/O bus 1222 is also connected to a location unit 1238. The location unit 1238 can create player information that indicates the wagering game machine's location/movements in a casino. In some embodiments, the location unit 1238 includes a global positioning system (GPS) receiver that can determine the wagering game machine's location using GPS satellites. In other embodiments, the location unit 1238 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 12, in some embodiments, the location unit 1238 is not connected to the I/O bus 1222.

In some embodiments, the wagering game machine 1206 can include additional peripheral devices and/or more than one of each component shown in FIG. 12. For example, in some embodiments, the wagering game machine 1206 can include multiple external system interfaces 1224 and/or multiple CPUs 1226. In some embodiments, any of the components can be integrated or subdivided.

In some embodiments, the wagering game machine 1206 includes a configuration module 1237. The configuration module 1237 can process communications, commands, or other information, where the processing can configure wagering game machines for presentation of a gaming effect capable of presentation via a bank of wagering game machines.

Furthermore, any component of the wagering game machine 1206 can include hardware, firmware, and/or machine-readable storage media including instructions for performing the operations described herein.

Wagering Game System

Figure 13:
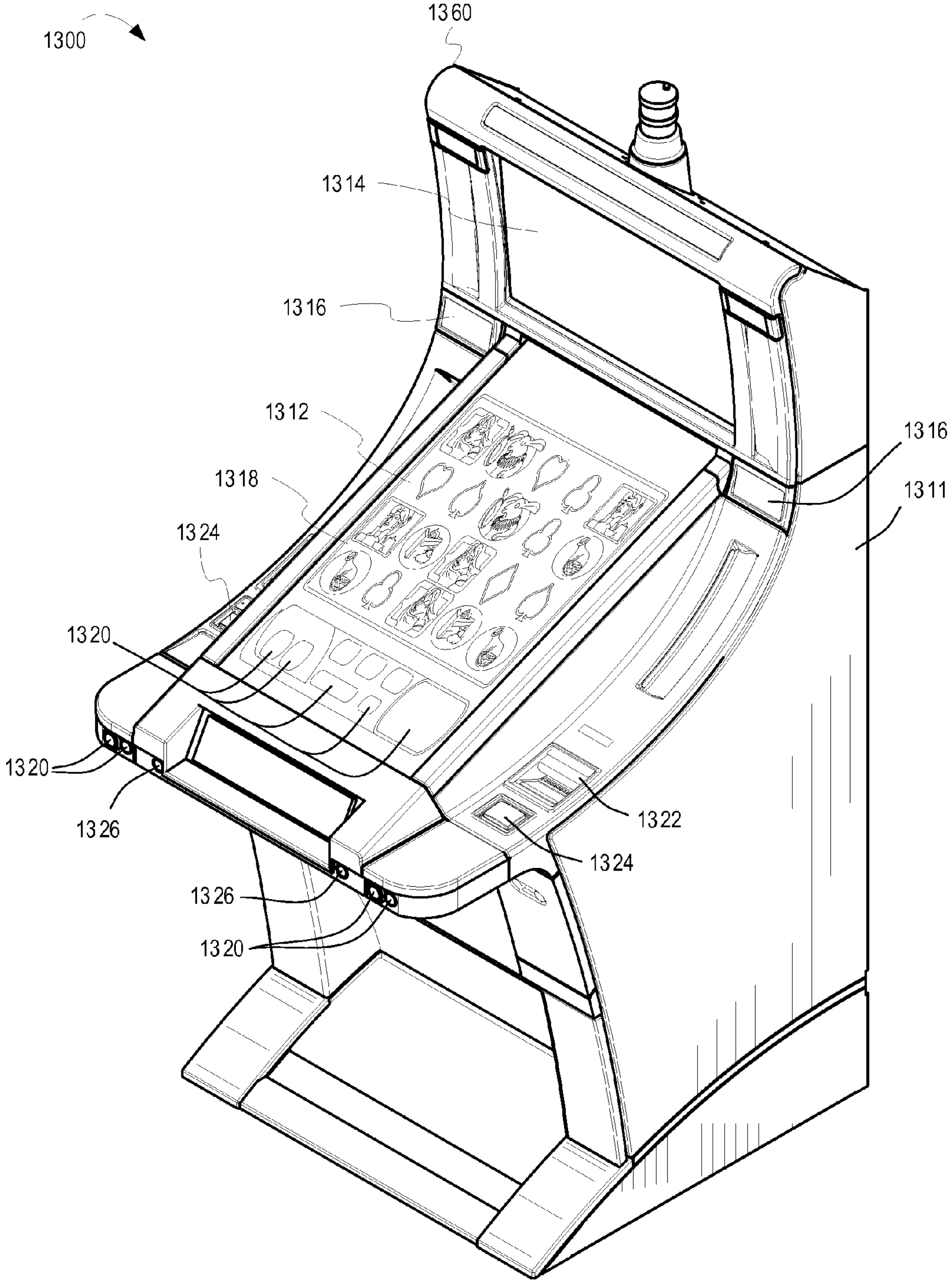
FIG. 13 is an illustration of a wagering game system 1300, according to some embodiments.

FIG. 13 is a conceptual diagram that illustrates an example of a wagering game system 1300, according to some embodiments. In FIG. 13, the wagering game system 1300 includes a wagering game machine 1360 similar to those used in gaming establishments, such as casinos. The wagering game machine 1360 may, in some examples, be referred to as a gaming terminal or an electronic gaming machine. The wagering game machine 1360 may have varying structures and methods of operation. For example, the wagering game machine 1360 may include electromechanical components configured to play mechanical slots. In another example, the 1360 includes electronic components configured to play a video casino game, such as slots, keno, poker, blackjack, roulette, craps, etc. The wagering game machine 1360 is depicted as a floor-standing model. However, other examples of wagering game machines include handheld mobile units, bartop models, workstation-type console models, etc. Further, the wagering game machine 1360 may be primarily dedicated for use in conducting wagering games, or may include non-dedicated devices, such as mobile phones, personal digital assistants, personal computers, etc. Exemplary types of wagering game machines are disclosed in U.S. Pat. No. 6,517,433 and Patent Application Publication Nos. US2010/0062196 and US2010/0234099, which are incorporated herein by reference in their entireties.

The wagering game machine 1360 illustrated in FIG. 13 comprises a cabinet 1311 that may house various input devices, output devices, and input/output devices. By way of example, the wagering game machine 1360 includes a primary display area 1312, a secondary display area 1314, and one or more audio speakers 1316. The primary display area 1312 or the secondary display area 1314 may include one or more of a cathode ray tube (CRT), a high resolution liquid crystal display (LCD), a plasma display, a light emitting diode (LED) display, a three-dimensional (3D) display, a video display, or a combination thereof. In some examples, the primary display area 1312 or the secondary display area 1314 includes mechanical reels to display a wagering game outcome. In some example, the primary display area 1312 or the secondary display area 1314 present a transmissive video display disposed in front of a mechanical-reel display to portray a video image superimposed upon the mechanical-reel display. In FIG. 13, the wagering game machine 1360 is a "slant-top" version in which the primary display 1312 is slanted (e.g., at about a thirty-degree angle toward the player of the wagering game machine 1360). Another example of wagering game machine 1360 is an "upright" version in which the primary display 1314 is oriented vertically relative to the player. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 1360. The wagering game machine 1360 includes a touch screen(s) 1318 mounted over the primary or secondary areas, buttons 1320 on a button panel, bill validator 1322, information reader/writer(s) 1324, and player-accessible port(s) 1326 (e.g., audio output jack for headphones, video headset jack, USB port, wireless transmitter/receiver, etc.). It should be understood that numerous other peripheral devices and other elements exist and are readily utilizable in any number of combinations to create various forms of a wagering game machine in accord with the present concepts.

Input devices, such as the touch screen 1318, buttons 1320, a mouse, a joystick, a gesture-sensing device, a voice-recognition device, and a virtual input device, accept player input (s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form (e.g., software, processing application) readable by a machine (e.g., a computer). For example, machine-readable storage media includes magnetic storage medium (e.g., floppy diskette), read only memory (ROM), random access memory (RAM), magnetic disk storage media, optical storage media (e.g., CD-ROM), magneto-optical storage media, flash memory, erasable programmable memory (e.g., EPROM and EEPROM), or other types of media suitable for storing electronic instructions. In addition, embodiments may be embodied in a machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming configuration system configured to provide configurations options for a wagering game effect, said method comprising:

detecting a user input from an interface associated with the gaming configuration system, wherein the user input indicates a request to configure a wagering game machine for presentation of the wagering game effect via an output device of the wagering game machine, wherein the wagering game machine is one of a plurality of gaming devices selected to present at least a portion of the wagering game effect according to a presentation sequence, and wherein the wagering game effect is associated with one or more casino wagering games;

in response to detecting the request, determining, via the gaming configuration system, a position of the wagering game machine in relation to at least one of a plurality of end nodes of the presentation sequence;

evaluating, via the gaming configuration system, the position of the wagering game machine in relation to the at least one of the plurality of end nodes of the presentation sequence against position-based criteria for presentation of the wagering game effect; and based on the evaluating, modifying an availability in the interface of at least one of a plurality of configuration options to configure the wagering game machine for the presentation of the wagering game effect.

2. The method of claim 1, wherein the evaluating the position of the wagering game machine against the position-based criteria for presentation of the wagering game effect comprises:

determining that an additional wagering game machine has already been configured to present one of the plurality of end nodes for the wagering game effect; and evaluating the position of the wagering game machine in the presentation sequence relative to a position of the one of the plurality of end nodes in the presentation sequence.

3. The method of claim 1, wherein the evaluating the position of the wagering game machine against the position-based criteria for presentation of the wagering game effect comprises detecting a value of a signal transmitted from an additional wagering game machine adjacent to the wagering game machine, and further comprising determining, based on the value, whether the position of the wagering game machine in the presentation sequence can be configured as one of the plurality of end nodes.

4. The method of claim 1, wherein the plurality of gaming devices comprise a plurality of wagering game machines networked together in a bank unit, wherein the wagering game machine is one of the plurality of wagering game machines, and wherein the presentation sequence comprises a synchronized pattern that traverses the plurality of wagering game machines from a first of the plurality of end nodes associated with a first of the plurality of wagering game machines, to a second of the plurality of end nodes associated with a second of the plurality of wagering game machines.

5. The computer-implemented method of claim 4, wherein the plurality of configuration options comprise indicators of potential positions for the wagering game machine in an order of the presentation sequence, wherein a portion of the indicators specify the plurality of end nodes, and wherein a portion of the indicators specify points in the presentation sequence that are not end nodes, and further comprising:

determining, based on the evaluating, that only a first of the plurality of end nodes has been configured, wherein the modifying the availability of the at least one of the plurality of configuration options to configure the wagering game machine comprises disabling one of the indicators that corresponds to the first of the plurality of end nodes to prevent the wagering game machine from being configured as the first of the plurality of end nodes.

6. The method of claim 5, wherein each of the plurality of wagering game machines are configured with emotive lighting fixtures on only a top, bottom, left, and right sides of a display device, wherein a first of the plurality of end nodes causes the emotive lighting fixtures to light up on only the top, bottom and left sides of the display device, wherein a second of the plurality of end nodes causes the emotive lighting fixtures to light up only on the top, bottom and right sides of the display device, and wherein points in the presentation sequence that are not end nodes cause the emotive lighting fixtures to light up on only the top and bottom sides of the display device.

7. The method of claim 1 further comprising:

providing, for presentation via the plurality of configuration options, a unique identifier of the wagering game machine;

detecting a selection of the unique identifier of the wagering game machine; and in response to detecting the selection of the unique identifier of the wagering game machine, causing the output device of the wagering game machine to present an indicator that the wagering game machine is selected for configuration.

8. The method of claim 1, wherein the position-based criteria comprises criteria for positioning of the wagering game machine in the presentation sequence according to one or more of a layout of a casino and a layout of a bank of wagering game machines.

9. The method of claim 1, wherein the wagering game effect is associated with one or more of a light effect, a sound effect, an attract presentation, a bonus game, and a wagering game feature.

10. The method of claim 1 further comprising:

determining that one side of the wagering game machine is not adjacent to any others of the plurality of gaming devices, and wherein the evaluating the position of the wagering game machine in relation to the at least one of the plurality of end nodes of the presentation sequence against the position-based criteria for presentation of the wagering game effect comprises determining that the wagering game machine must be one of the plurality of end nodes for the presentation sequence in response to the determining that the one side of the wagering game machine is not adjacent to any others of the plurality of gaming devices.

11. One or more non-transitory, machine-readable storage media having instructions stored thereon, which when executed by a set of one or more processors of a gaming system cause the set of one or more processors to perform operations comprising:

detecting, based on user input from an interface associated with the gaming system, a request to configure a first wagering game machine, of a plurality of wagering game machines, for presentation of a wagering game effect via an output device of the first wagering game machine, wherein the plurality of wagering game machines are selected to present at least a portion of the wagering game effect according to a presentation sequence, and wherein the wagering game effect is associated with one or more casino wagering games;

determining that a second wagering game machine, of the plurality of wagering game machines, has already been configured as one of a plurality of end nodes in the presentation sequence for the wagering game effect;

evaluating a position of the first wagering game machine relative to a position of the second wagering game machine; and based on the evaluating, disabling an availability of at least one of a plurality of configuration options to configure the first wagering game machine for the presentation of the wagering game effect as the one of the plurality of end nodes.

12. The one or more non-transitory, machine-readable storage media of claim 11, wherein the wagering game effect is presentable according to a synchronized pattern via the plurality of wagering game machines, wherein the plurality of wagering game machines are networked together in a bank unit.

13. The one or more non-transitory, machine-readable storage media of claim 12, wherein the plurality of configuration options comprise indicators of potential positions for the first wagering game machine in an order of the synchronized pattern, and wherein the operation of disabling the availability of the at least one of the plurality of configuration options to configure the first wagering game machine, includes an operation comprising disabling one of the indicators associated with the one of the plurality of end nodes based on the position of the first wagering game machine in the order of the synchronized pattern.

14. The one or more non-transitory, machine-readable storage media of claim 11, said operations further comprising:

providing a graphical representation of the first wagering game machine;

detecting a selection of the graphical representation of the first wagering game machine; and in response to detecting the selection of the graphical representation of the first wagering game machine, causing the output device on the first wagering game machine to present an indicator that the first wagering game machine is selected for configuration.

15. The one or more non-transitory, machine-readable storage media of claim 11, wherein the operation of evaluating the position of the first wagering game machine relative to the position of the second wagering game machine includes operations comprising detecting a value of a signal transmitted from the second wagering game machine, and wherein the disabling the availability of the at least one of the plurality of configuration options comprises disabling the at least one of the plurality of configuration options according to the value of the signal.

16. A gaming configuration system comprising:

at least one gaming configuration controller; and at least one memory device configured to store instructions which, when executed by the at least one gaming configuration controller, cause the gaming configuration system to perform operations to detect a user input from an interface associated with the gaming configuration system, wherein the user input indicates a request to configure a wagering game machine for presentation of a wagering game effect via an output device of the wagering game machine, wherein the wagering game machine is one of a plurality of gaming devices selected to present at least a portion of the wagering game effect according to a presentation sequence, and wherein the wagering game effect is associated with one or more casino wagering games, in response to detection of the request, determine a position of the wagering game machine in relation to at least one of a plurality of end nodes of the presentation sequence, evaluate the position of the wagering game machine in relation to the at least one of the plurality of end nodes of the presentation sequence against position-based criteria for the presentation of the wagering game effect, and based on evaluation of the position of the wagering game machine against the position-based criteria for the presentation of the wagering game effect, modify an availability in the interface of at least one of a plurality of options to configure the wagering game machine for the presentation of the wagering game effect.

17. The gaming configuration system of claim 16, wherein the wagering game effect is presentable according to a synchronized pattern via a plurality of wagering game machines networked together in a bank unit, and wherein the wagering game machine is one of the plurality of wagering game machines.

18. The gaming configuration system of claim 17, wherein the at least one memory device configured to store the instructions to evaluate the position of the wagering game machine against the position-based criteria for presentation of the wagering game effect is configured to store instructions that cause the gaming configuration system to, determine that an additional wagering game machine has already been configured to present one of the plurality of end nodes for the wagering game effect, and evaluate the position of the wagering game machine in the presentation sequence relative to a position of the one of the plurality of end nodes in the presentation sequence.

19. The gaming configuration system of claim 17, wherein the plurality of options comprise indicators of potential positions for the wagering game machine in an order of the presentation sequence, wherein a first portion of the indicators specify the plurality of end nodes, and wherein a second portion of the indicators specify points in the presentation sequence that are not end nodes, and wherein the at least one memory device configured to store instructions to cause the gaming configuration system to perform operations to modify the availability of the at least one of the plurality of options, is configured to store instructions which, when executed by the at least one gaming configuration controller, cause the gaming configuration system to disable one of the indicators based on the position of the wagering game machine in the order of the presentation sequence.

20. The gaming configuration system of claim 16, wherein the at least one memory device is configured to store the instructions, which when executed by the at least one gaming configuration controller, cause the gaming configuration system to perform operations to provide a representation of the wagering game machine, detect a selection of the representation of the wagering game machine, and in response to detection of the selection of the representation of the wagering game machine, cause the output device on the wagering game machine to present an indicator that the wagering game machine is selected for configuration.

21. The gaming configuration system of claim 16, wherein the at least one memory device configured to store the instructions to evaluate the position of the wagering game machine against the position-based criteria for the presentation of the wagering game effect is configured to store instructions, which when executed by the at least one gaming configuration controller, cause the gaming configuration system to perform operations to detect a value of a signal transmitted from an additional wagering game machine adjacent to the wagering game machine, and disable the at least one of the plurality of options according to the value of the signal.

22. The gaming configuration system of claim 16, wherein the position-based criteria comprises one or more of a layout of a casino and a layout of a bank of wagering game machines.

* * * * *